US008868907B2

(12) United States Patent
Graham et al.

(10) Patent No.: US 8,868,907 B2
(45) Date of Patent: *Oct. 21, 2014

(54) DEVICE, METHOD, AND SYSTEM FOR PROCESSING COMMUNICATIONS FOR SECURE OPERATION OF INDUSTRIAL CONTROL SYSTEM FIELD DEVICES

(71) Applicant: University of Louisville Research Foundation, Inc., Louisville, KY (US)

(72) Inventors: James H. Graham, Sellersburg, IN (US); Jeffrey L. Hieb, Shelbyville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/758,548

(22) Filed: Feb. 4, 2013

(65) Prior Publication Data
US 2013/0151849 A1 Jun. 13, 2013

Related U.S. Application Data

(63) Continuation-in-part of application No. 12/726,105, filed on Mar. 17, 2010, now Pat. No. 8,402,267.

(60) Provisional application No. 61/594,687, filed on Feb. 3, 2012, provisional application No. 61/161,179, filed on Mar. 18, 2009.

(51) Int. Cl.
*H04L 29/06* (2006.01)
*H04L 9/32* (2006.01)
(Continued)

(52) U.S. Cl.
CPC *H04L 9/32* (2013.01); *G06F 21/00* (2013.01); *G06F 21/31* (2013.01); *G06F 21/85* (2013.01)
USPC .............. 713/164; 709/225; 709/229; 380/44

(58) Field of Classification Search
USPC ................. 713/164, 168–174, 182–186, 202; 709/225, 229; 729/2–8; 726/2–8
See application file for complete search history.

(56) References Cited

U.S. PATENT DOCUMENTS 5,771,383 A * 6/1998 Magee et al. ................. 719/312
6,173,438 B1 1/2001 Kodosky et al.
(Continued)

FOREIGN PATENT DOCUMENTS

WO 9909473 2/1999
WO 0076158 12/2000
(Continued)

OTHER PUBLICATIONS

Alves-Foss et al., "A Multi-Layered Approach to Security in High Assurance Systems," Proceedings of the Thirty-Seventh Annual Hawaii Internal Conference on System Sciences, (HICSS'04)—Track 9, 2004.
(Continued)

*Primary Examiner* — Evans Desrosiers
(74) *Attorney, Agent, or Firm* — Stites & Harbison PLLC; Jeffrey A. Haeberlin

(57) ABSTRACT

A device, method, and system for processing communications for secure operation of industrial control system field devices, includes: a processing device to be placed in-line between a Master Telemetry Unit (MTU) and a field device. A software verified microkernel includes instructions for the processing device to provide a secure partitioning of memory between a communication network interface address space, a security cell address space, and a field device interface address space. The security cell address space includes instructions to: receive communication messages from the MTU via the communication network interface address space; authenticate a user identification of each communication message; verify that an operation requested in each message is authorized for the user identification; and send each communication message having an authenticated user identification and a verified operation to the field network interface address space for communication with the field device.

15 Claims, 21 Drawing Sheets

(51) Int. Cl.
    *G06F 21/00*     (2013.01)
    *G06F 21/31*     (2013.01)
    *G06F 21/85*     (2013.01)
    *H04L 9/00*     (2006.01)
    *G06F 15/173*     (2006.01)
    *G06F 15/16*     (2006.01)

(56) References Cited

U.S. PATENT DOCUMENTS

| | | | |
|---|---|---|---|
| 6,628,992 | B2 | 9/2003 | Osburn, III |
| 6,715,139 | B1 | 3/2004 | Kodosky et al. |
| 6,950,851 | B2 | 9/2005 | Osburn, III |
| 6,961,753 | B1 | 11/2005 | Osburn, III |
| 6,970,909 | B2 | 11/2005 | Schulzrinne |
| 7,246,156 | B2 | 7/2007 | Ginter et al. |
| 7,376,191 | B2 | 5/2008 | Melick et al. |
| 7,545,868 | B2 | 6/2009 | Kennedy et al. |
| 7,647,562 | B2 | 1/2010 | Ghercioiu et al. |
| 8,402,267 | B1 | 3/2013 | Graham et al. |
| 2003/0196187 | A1 | 10/2003 | Kodosky et al. |
| 2004/0010734 | A1 | 1/2004 | Ghercioiu et al. |
| 2004/0264699 | A1 | 12/2004 | Meandzija |
| 2005/0076198 | A1 | 4/2005 | Skomra |
| 2005/0120160 | A1* | 6/2005 | Plouffe et al. ............ 711/1 |
| 2005/0131922 | A1 | 6/2005 | Kennedy et al. |
| 2005/0249236 | A1 | 11/2005 | Walden |
| 2005/0289274 | A1 | 12/2005 | Ghercioiu et al. |
| 2006/0288426 | A1 | 12/2006 | Saito |
| 2007/0294369 | A1 | 12/2007 | Ginter et al. |
| 2008/0016313 | A1 | 1/2008 | Murotake |
| 2008/0159416 | A1 | 7/2008 | Melick et al. |
| 2008/0209033 | A1 | 8/2008 | Ginter et al. |

FOREIGN PATENT DOCUMENTS

| | | |
|---|---|---|
| WO | 0231669 | 4/2002 |
| WO | 03/053123 | 7/2003 |
| WO | 03094461 | 11/2003 |
| WO | 03107626 | 12/2003 |
| WO | 2004006205 | 1/2004 |
| WO | 2004111785 | 12/2004 |
| WO | 2006089411 | 8/2006 |
| WO | 2007100633 | 9/2007 |

OTHER PUBLICATIONS

Heib et al., "Chapter 9, Designing Security-Hardened Microkernels for Field Devices," Critical Infrastructure Protection II, 2008, pp. 123-134, Springer Science + Business Media, L.L.C., New York, NY.
Guffy et al., Evaluation of MILS and Reduced Kernel Security Concepts for SCADA Remote Terminal Units, 2006, Technical Report TR-ISRL-06-02, Intelligent Systems Research Laboratory, Department of Computer Engineering and Computer Science, University of Louisville, Louisville, Kentucky.
Gumstix, Gumstix Verdex Pro XM4 COM, product information accessed at http://www.gumstix.com/store/catalog/product_info.php?products_id=209, product specifications accessed at http://www.gumstix.net/Hardware/view/Hardware-Feature-Overview-Sheets/Gumstix-Verdex-Pro-Feature-Overview/112.html.
Gumstix, Gumstix Verdex Pro XM4 COM, product details accessed at http://www.gumstix.conn\store/catalog/product_info.php-?products_id=209&show_tab=details.
Gumstix, Gumstix netpro-vx, product information accessed at http://www.gumstix.com/store/catalog/product_info.php?products_id=207.
Hanebutte et al., "Software Mediators for Transparent Channel Control in Unbounded Environments," Proceedings of the 2002 IEEE Workshop on Information Assurance and Security, 2002, pp. 30-35.
Hartig et al., "The Nizza Secure-System Architecture," Proceedings of the 1st International Conference on Collaborative Computing: Networking, Applications and Worksharing (CollaborateCom), 2005.
Hieb, J.L., "Microkernels for Hardened RTUs," Chapter VII from PhD Dissertation of J. L. Hieb, University of Louisville, May 2008.
Hieb et al., "Security-Enhanced Remote Terminal Units for SCADA Networks," Proceedings of Nineteenth ISCA International Conference on Computer Applications in Industry and Engineering, 2006, pp. 271-276.
Hieb et al., "Chapter 10, Security Enhancements for Distributed Control Systems," Critical Infrastructure Protection, E. Goetz and S.Shenoi (Eds.), Springer, Boston, Massachusetts, 2007, pp. 133-146.
Igure et al., "Security Issues in SCADA Networks," Computers and Security, 25(7), 2006, pp. 498-506.
Liedtke J., "On Micro-Kernal Construction," ACM SIGOPS Operating Systems Review, 29(5), 1995, pp. 237-250.
Hieb et al. "Microkernel-Based Security-Hardened Field Devices for Distributed Control Systems," compilation of printed slides presented at 2nd IFIP Working Group 11.10 International Conference on Critical Infrastructure Protection, Mar. 18, 2008, George Mason University, Arlington, VA.
Miller A, "Trends in Process Control Systems Security," IEEE Security and Privacy, 3(5), 2005, pp. 57-60.
Heiser, "Iguana User Manual," National ICT Australia (NICTA), Rev. 1.62, 2004, Eveleigh, Australia, accessed at http://ertos.nicta.com.au/software/kenge/iguana-project/latest/userman.pdf.
Open Kernel Labs, "OKL4 Microkernel Reference Manual," API Version 03, document No. OK 10000: 2006, Rev. 12, 2008, accessed at http://wiki.ok-labs.com/downloads/release-3.0/okl4-ref-manual-3.0.pdf.
Singaravelu et al., "Reducing TCB Complexity for Security-Sensitive Applications: Three Case Studies," ACM SIGOPS Systems Review, 40(4), 2006, pp. 161-174.
Tanenbaum et al., "Can we Make Operating Systems Reliable and Secure?," IEEE Computer, 39(5), 2006, pp. 44-51.
Farris et al., "Evaluation of Secure Peer-to-Peer Overlay Routing for Survivable SCADA Systems," Proceedings of the 2004 Winter Simulation Conference, pp. 300-308.
Cosse, Jr et al., "Smart Industrial Substations, A Modern Integrated Approach to Plant Safety, Reliability, and Production," IEEE Industry Applications Magazine, vol. 11, No. 2, 2005, pp. 12-20.
Lizzi et al., "Prototyping QoS based Architecture for Power Plant Control Applications," IEEE Int. Workshop Factory Commun. Syst., Sep. 6-8, 2000, pp. 119-126.
Cawfield, "Achieving Fault-Tolerance with Pc-Based Control," ISA EXPO 98, International Conference and Exposition for Advancing Measurement and Control Technologies, Products, and Services, Automation and Control Issues and Solutions, vol. 1, 1998, pp. 197-209.
Bloom B.H., "Space/Time Trade-offs in Plash Coding With Allowable Errors," Communications of the ACM, 1970, vol. 13:(7), pp. 422-426.
Hao et al., "Building High Accuracy Bloom Filters Using Partitioned Hashing," ACM Sigmetrics, 2007, pp. 277-287.
Patel et al., "Secure Internet-Based SCADA for Monitoring and Control of Industrial Processes," International Journal of Computers and Their Applications, 2010, vol. 1, No. 1, pp. 41-51.
Hieb et al., "Using Bloom Filters to Ensure Access Control and Authentication Requirements for SCADA Field Devices," Critical Infrastructure Protection VI, IFIP Advances in Information and Communication Technology, 2012, vol. 390, pp. 85-97.
Kalfa, Winfried, Proposal of an External Processor Scheduling in Micro-kernel based Operating System, May 1991.
Hieb et al., "A Prototype Security Hardened Field Device for Industrial Control Systems" In Proceedings of the International Conference on Advanced Computing and Communications, 2010, Orlando: ISCA, pp. 95-100.
Qiao et al., "One Memory Access Bloom Filters and Their Generalization," in 2011 Proceedings IEEE Infocom, pp. 1745-1753.
Hieb et al., "A security-hardened appliance for implementing authentication and access control in SCADA infrastructures with legacy field devices," International Journal of Critical Infrastructure Protection, Jan. 2013, pp. 1-14.
International Search Report for EP/2009/053084, dated Apr. 28, 2009.

* cited by examiner

| Function Code | Description |
|---|---|
| 40 | Connection Request |
| 41 | Challenge |
| 42 | Challenge Response |

FIG. 17

| Byte | 1 | 2 | 3 | 4-5 |
|---|---|---|---|---|
| Data | ADDRESS | 40 | USER ID | CRC |

FIG. 18

| Byte | 1 | 2 | 3-6 | 7-8 |
|---|---|---|---|---|
| Data | ADDRESS | 41 | NONCE | CRC |

FIG. 19

| Byte | 1 | 2 | 3-10 | 11-12 |
|---|---|---|---|---|
| Data | ADDRESS | 42 | HASH | CRC |

FIG. 20

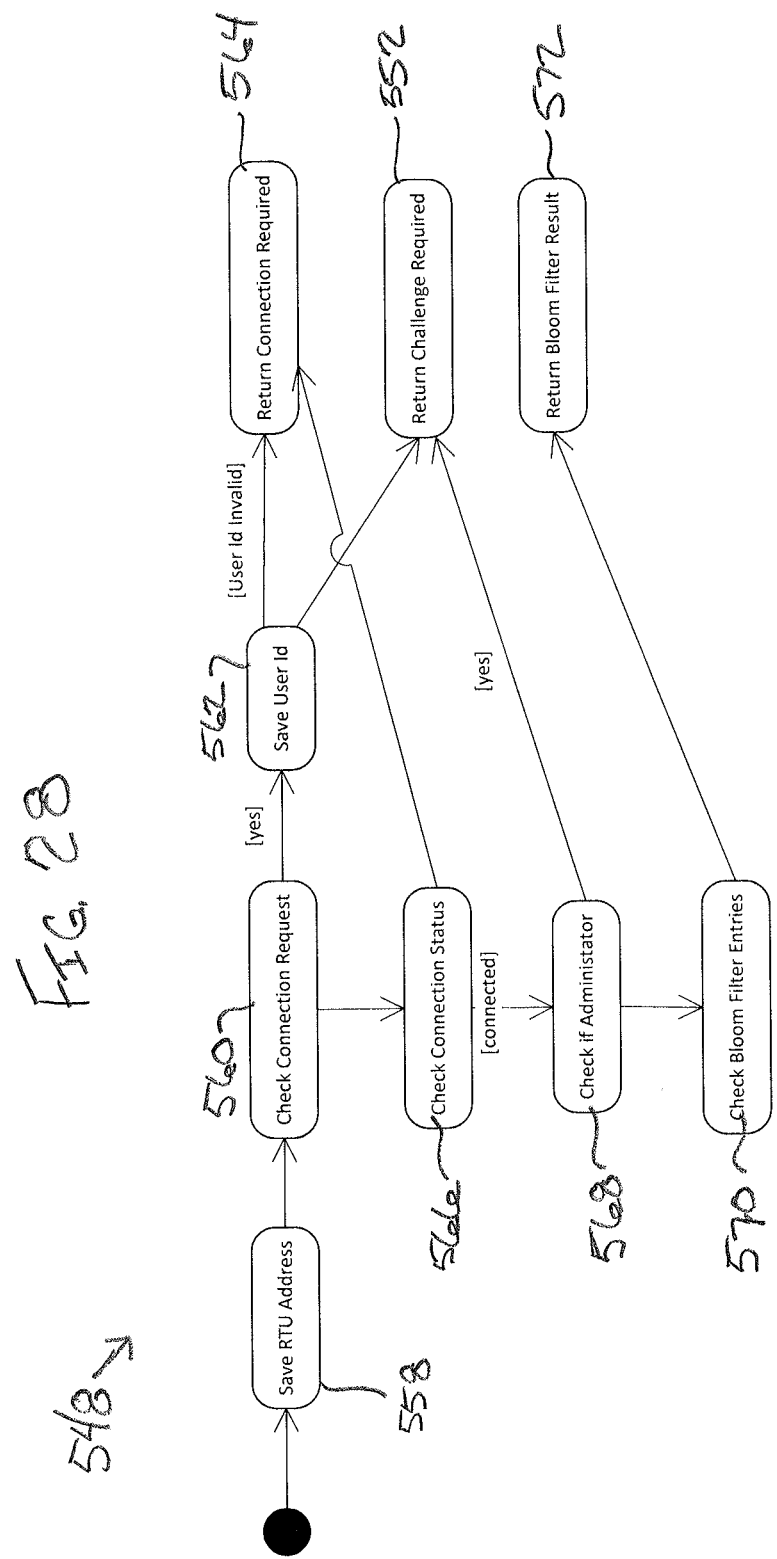

DEVICE, METHOD, AND SYSTEM FOR PROCESSING COMMUNICATIONS FOR SECURE OPERATION OF INDUSTRIAL CONTROL SYSTEM FIELD DEVICES

CROSS-REFERENCE TO RELATED APPLICATIONS

This application claims the benefit of U.S. Provisional Application No. 61/594,687, filed Feb. 3, 2012, which is hereby incorporated by reference. This application is a continuation-in-part of prior application Ser. No. 12/726,105, filed Mar. 17, 2010, which claims priority from U.S. Provisional Application Ser. No. 61/161,179, filed Mar. 18, 2009, which are hereby incorporated by reference.

STATEMENT REGARDING FEDERALLY SPONSORED RESEARCH OR DEVELOPMENT

The presently disclosed subject matter was made with support from the U.S. Government under Grant Number 2004-IJ-CX-K055 awarded by the Department of Justice, National Institute of Justice, and under Subcontract Number 10-09-UL awarded by the National Institute for Hometown Security. Thus, the U.S. Government has certain rights in the presently disclosed subject matter.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to security hardening of network devices, such as supervisory control and data acquisition (SCADA) field devices, against electronic intrusions (cyber-attacks). The present invention also relates to a device, method, and system for processing communications for secure operation of industrial control system field devices.

2. Background

A. Security Hardening of Network Devices

Network devices in computer networks, such as field devices employed in distributed control systems (DCSs), may connect devices and elements requiring protected operations, such as sensors and actuators, to control networks providing, for example, remote measuring and control capabilities. Field devices employed in DCSs will be used herein as an example of network devices requiring protected operations.

Early DCSs were isolated proprietary systems with limited exposure to cyber threats. For example, such DCSs often utilized dedicated serial communication lines and implemented proprietary communication protocols in connecting field devices to supervisory control and data acquisition (SCADA) system components. However, modern DCSs often engage commercial computing platforms and operating systems (e.g., Linux) and industry standard network technologies (e.g., Ethernet, TCP/IP), which significantly increase the vulnerability of the DCSs to cyber attacks.

While major disasters have thus far been averted, incidents such as the 2003 Slammer worm penetration of the Davis-Besse nuclear power plant network in Oak Harbor, Ohio, and the 2006 hacker attack on a water treatment facility in Harrisburg, Pa. underscore the significance of the cyber threat.

Field devices are attractive targets for cyber attacks on control systems. Since these devices are used for measurement and control of physical systems, preventing these attacks is essential to securing DCSs and, by extension, the critical infrastructures assets they operate. Unlike early field devices, which were highly specialized systems, modern field devices use commercially available hardware and software and can be attacked quite easily.

Thus, there is generally a need to secure network devices, such as field devices, and their operating systems.

In traditional IT communication structure, security is implemented by protecting servers (e.g., web servers), database "back ends," etc., and the perimeter network devices are less protected ("hard protection in the middle, soft protection on the outside" security design). However, as discussed above, for SCADA networks there is a need to also protect perimeter network devices, such as the field devices in SCADA systems, which perform sensitive operations (similar to protecting the individual PCs in the traditional IT structure).

Efforts toward this end, to date, have included implementation of firewalls, and some work in adding security to communication protocols. SCADA protocols are implemented in the application layer of an IT device. However, for IT devices the operating system, and hardware, is the security enforcement base on which security in the application layer depends. The operating system itself, is a potential "attack surface." Ultimately, any security layer above the operating system depends on the operating system to enforce that security.

With a monolithic kernel, which includes the operating system, drivers, and file system, if the operating system can be attacked, then security can be circumvented.

A microkernel is a kernel that contains only those elements that cannot be implemented outside the kernel. Instead of having an operating system that includes the functionality traditionally associated with most operating systems, such as Windows, only those functions that must be in the operating system remain therein. For example, Linux has approximately 15 million lines of code, and Windows has approximately 30 million lines of code. The OKL4, which is a microkernel, has only about 15,000 lines of code.

FIG. 1 is a schematic comparison of a monolithic kernel 10 to a microkernel 12.

Multiple independent levels of security (MILS) 14 (FIG. 2) and Nizza 16 (FIG. 3) are two microkernel-based security architectures. The MILS architecture, which was developed for high assurance and high performance computing, is based on Rushby's separation kernel (see: J. Liedtke, On microkernel construction, ACM SIGOPS Operating Systems Review, vol. 29(5), pp. 237-250, 1995). The MILS architecture enforces strict security and separation policies on data and processes within a single processor (see: A. Tanenbaum, J. Herder and H. Bos, Can we make operating systems reliable and secure? IEEE Computer, vol. 39(5), pp. 44-51, 2006). The Nizza architecture is based on the L4 microkernel and protects security critical code.

MILS and Nizza employ isolated partitions, each with its own protection domain, that allow software and data of different security levels or sensitivity to be decoupled from potentially less secure software. Secure compartmentalization of components and inter-process communication (IPC) allow the trusted computing base (TCB) to remain small, comprising only the kernel and security-critical code; application software resides outside the TCB. In the MILS architecture, this enables high assurance application layer reference monitors to be inserted between application software components. In Nizza, security-critical code is removed from commercial applications and placed in a protected isolated compartment, keeping the TCB small. An application of Nizza is to the secure signing of email (see: L. Singaravelu, C. Pu, H. Hartig and C. Helmuth, Reducing TCB complexity for security-sensitive applications: Three case studies, ACM SIGOPS Systems Review, vol. 40(4), pp. 161-174, 2006).

MILS and Nizza primarily focus on protecting the confidentiality of data. MILS is designed for government and military systems that have multilevel security (MLS) requirements, where independent systems have historically been used for different security levels. Nizza is aimed at desktop and commodity computing applications that require small TCBs, mainly for protecting sensitive user data.

However, availability and integrity—rather than confidentiality—are the principal goals in securing sensitive network devices themselves, such as field devices in SCADA systems. As such, MILS and Nizza do not provide the requisite functionality for securing such network devices.

B. Device, Method, and System for Processing Communications for Secure Operation of Industrial Control System Field Devices Supervisory control and data acquisition (SCADA) and distributed control systems (DCS) are networks of computer based systems that provide remote telemetry of physical systems and processes. Collectively they are referred to as Industrial Control Systems (ICS). ICSs play a central role in the daily operation of a vast array of services and infrastructure on which we have all come to rely; these include: electric power, fresh drinking water, waste water treatment, gas and oil distribution, industrial manufacturing, and many others. A typical ICS system consists of: a Master (Master Telemetry Unit (MTU)/Human Machine Interface (HMI)), one or more field devices, and a communications infrastructure. The Master processes information received from field devices and sends control directives back out to field devices. Common types of field devices are remote telemetry units (RTU), intelligent electronic devices (IED) and programmable logic controllers (PLC). Field devices and the Master are connected by the communications infrastructure (i.e., a communications network). Many different medium are used for the communication network including: leased lines, PSTNs, cellular networks, and various types of UHF/VHF radio. In general the communication protocols used by field devices and Masters are referred to as SCADA protocols.

FIG. 8 shows the main elements of a simple SCADA system 400, including a Master 402, a field device 404, and a communication infrastructure 406.

When these systems were initially developed, little attention was paid to cyber-security because the systems were physically isolated and used proprietary hardware, software, and communication protocols. For many reasons such as: enterprise network connections to the control network, increased use of commodity hardware and software, and the increased use of TCP/IP in industrial communications networks, these systems are now vulnerable to cyber-based attacks. Legacy field devices present unique security challenges. Many legacy systems were designed before cyber-security concerns became relevant and so lack security features. Many also have reduced processing power, memory, and other storage resources, often to the degree that algorithms for cyber-security are not possible or practical to implement. Furthermore, these devices have long life-cycles, 20-30 years, and can be costly and difficult to replace.

One of the biggest continuing problems is unscrupulous persons finding a way to exploit something that was not planned. For example, an obscure combination of consecutive key strokes produces an unexpected result, resulting in a security breach in an otherwise secure and important piece of software.

BRIEF SUMMARY OF THE INVENTION

Generally described, in accordance with one aspect of the invention, a device for processing communications for secure operation of industrial control system field devices, includes: a processor, a memory, and a communication controller operably connected to form a processing device to be placed in-line between a Master Telemetry Unit (MTU) and a field device. A software verified microkernel is stored in the memory and includes instructions for the processing device to provide a secure partitioning of the memory between a communication network interface address space, a security cell address space, and a field device interface address space. The communication network interface address space includes software instructions and memory space for the processor to manage communication messages with the MTU, each communication message including a user identification identifying the sender of the message and a requested operation to be performed by the field device. The field network interface address space includes software instructions and memory space for the processor to manage communication messages with the field device. The security cell address space includes software instructions and memory space for the processor to: receive communication messages from the MTU via the communication network interface address space; authenticate the user identification of each communication message; verify that the operation requested in each message is authorized for the user identification; and send each communication message having an authenticated user identification and a verified operation to the field network interface address space for communication with the field device.

The software instructions for the processor to authenticate the user identification of each communication message may include instructions for the processor to: send a first challenge packet to the MTU via the communication network interface address space in response to determining that the operation requested in a message is a connection request, the first challenge packet including a first nonce; hash an authentication byte array including the first nonce and a pre-shared secret value for the user identification to create an authentication byte array hash; and, in response to receiving a challenge response packet from the MTU via the communication network interface address space, authenticate the user identification when a packet hash of the challenge response packet matches the authentication byte array hash.

The software instructions for the processor to verify that the operation requested in each message is authorized for the user identification may include instructions for the processor to: in response to receiving a communication message with an authenticated user identification, hash a verification byte array including the requested operation and the user identification to create a verification byte array hash; and verify that the operation requested in each message is authorized for the user identification when each bit position of the verification byte array hash has a "1" in the corresponding bit position of an access Bloom Filter, the access Bloom Filter prepopulated with authorized operations permitted for the user identification, and each bit position of the verification byte array hash has a "1" in the corresponding bit position of a challenge Bloom Filter, the challenge Bloom Filter prepopulated with authorized operations not requiring a challenge. Then, the software instructions for the processor to verify that the operation requested in each message is authorized for the user identification may include instructions for the processor to: when each bit position of the verification byte array hash does not have a "1" in the corresponding bit position of a challenge Bloom Filter, send a second challenge packet to the MTU via the communication network interface address space, the second challenge packet including a second nonce; hash a re-authentication byte array including the second nonce and the pre-shared secret value for the user identification to create a re-authentication byte array hash; in response to receiving a challenge response packet from the MTU via the communication network interface address space, re-authenticate the user identification when a packet hash of the challenge response packet matches the re-authentication byte array hash; and verify that the operation requested in the message is authorized for the user identification when the user identification is re-authenticated.

The software instructions for the processor to verify that the operation requested in each message is authorized for the user identification may also include instructions for causing the processor to: in response to receiving a communication message with an authenticated user identification, and when the authenticated user identification is an administrator user identification, send a second challenge packet to the MTU via the communication network interface address space, the second challenge packet including a second nonce; hash a re-authentication byte array including the second nonce and the pre-shared secret value for the user identification to create a re-authentication byte array hash; and verify that the operation requested in the communication message is authorized for the user identification in response to receiving a challenge response packet from the MTU via the communication network interface address space when a packet hash of the challenge response packet matches the re-authentication byte array hash.

In accordance with another aspect of the invention, a method for processing communications for secure operation of industrial control system field devices, includes: partitioning, by a processor executing a software verified microkernel, a memory between a communication network interface address space, a security cell address space, and a field device interface address space; managing, by the processor executing software instructions of the communication network interface address space, communication messages with a Master Telemetry Unit (MTU), each communication message including a user identification identifying the sender of the message and a requested operation to be performed by a field device; managing, by the processor executing software instructions of the field network interface address space, communication messages with the field device; receiving, by the processor executing software instructions of the security cell address space, communication messages from the MTU via the communication network interface address space; authenticating, by the processor executing software instructions of the security cell address space, the user identification of each communication message; verifying, by the processor executing software instructions of the security cell address space, that the operation requested in each message is authorized for the user identification; and sending, by the processor executing software instructions of the security cell address space, each communication message having an authenticated user identification and a verified operation to the field network interface address space for communication with the field device.

In one implementation, authenticating the user identification of each communication message further comprises: sending a first challenge packet to the MTU via the communication network interface address space in response to determining that the operation requested in a message is a connection request, the challenge packet including a first nonce; hashing, by the processor executing software instructions of the security cell address space, an authentication byte array including the first nonce and a pre-shared secret value for the user identification to create an authentication byte array hash; and in response to receiving a challenge response packet from the MTU via the communication network interface address space, authenticating, by the processor executing software instructions of the security cell address space, the user identification when a packet hash of the challenge response packet matches the authentication byte array hash.

Verifying that the operation requested in each message is authorized for the user identification may further include: in response to receiving a communication message with an authenticated user identification, hashing a verification byte array including the requested operation and the user identification to create a verification byte array hash; and verifying that the operation requested in each message is authorized for the user identification when: each bit position of the verification byte array hash has a "1" in the corresponding bit position of an access Bloom Filter, the access Bloom Filter prepopulated with authorized operations permitted for the user identification; and each bit position of the verification byte array hash has a "1" in the corresponding bit position of a challenge Bloom Filter, the challenge Bloom Filter prepopulated with authorized operations not requiring a challenge. Additionally, verifying that the operation requested in each message is authorized for the user identification may still further include: when each bit position of the verification byte array hash does not have a "1" in the corresponding bit position of a challenge Bloom Filter, sending a second challenge packet to the MTU via the communication network interface address space, the second challenge packet including a second nonce; hashing a re-authentication byte array including the second nonce and the pre-shared secret value for the user identification to create a re-authentication byte array hash; in response to receiving a challenge response packet from the MTU via the communication network interface address space, re-authenticating the user identification when a packet hash of the challenge response packet matches the re-authentication byte array hash; and verifying that the operation requested in the message is authorized for the user identification when the user identification is re-authenticated.

Verifying that the operation requested in each message is authorized for the user identification may further include: in response to receiving a communication message with an authenticated user identification, and when the authenticated user identification is an administrator user identification, sending a second challenge packet to the MTU via the communication network interface address space, the second challenge packet including a second nonce; hashing a re-authentication byte array including the second nonce and the pre-shared secret value for the user identification to create a re-authentication byte array hash; and verifying that the operation requested in the communication message is authorized for the user identification in response to receiving a challenge response packet from the MTU via the communication network interface address space when a packet hash of the challenge response packet matches the re-authentication byte array hash.

According to another aspect of the invention, a system for processing communications for secure operation of an industrial control system field device includes: a field device; a Master Telemetry Unit (MTU) communicating with the field device via communication messages; a security pre-processor device in communication with the MTU and the field device, and collocated with the field device. The security pre-processor device includes: a processor, a memory, and a communication controller operably connected to form a processing device to be placed in-line between the MTU and the field device; a software verified microkernel stored in the memory including instructions for the processing device to provide a secure partitioning of the memory between a communication network interface address space, a security cell address space, and a field device interface address space; the communication network interface address space including software instructions and memory space for the processor to manage communication messages with the MTU, each communication message including a user identification identifying the sender of the message and a requested operation to be performed by the field device; the field network interface address space including software instructions and memory space for the processor to manage communication messages with the field device; and the security cell address space including software instructions and memory space for the processor to: receive communication messages from the MTU via the communication network interface address space; authenticate the user identification of each communication message; verify that the operation requested in each message is authorized for the user identification; and send each communication message having an authenticated user identification and a verified operation to the field network interface address space for communication with the field device.

The software instructions for the processor to authenticate the user identification of each communication message may include instructions for the processor to: send a first challenge packet to the MTU via the communication network interface address space in response to determining that the operation requested in a message is a connection request, the first challenge packet including a first nonce. The MTU may then include a support component for: receiving the first challenge packet; displaying a prompt to enter a secret value; in response to receiving the secret value, hashing the first nonce with the secret value to create a packet hash; creating a challenge response packet including the packet hash; and sending the challenge response packet to the security pre-processor device. Then, the software instructions for the processor to authenticate the user identification of each communication message may include instructions for the processor further to: hash an authentication byte array including the first nonce and a pre-shared secret value for the user identification to create an authentication byte array hash; and in response to receiving the challenge response packet from the MTU via the communication network interface address space, authenticate the user identification when the packet hash of the challenge response packet matches the authentication byte array hash.

The software instructions for the processor to verify that the operation requested in each message is authorized for the user identification may include instructions for the processor to: in response to receiving a communication message with an authenticated user identification, hash a verification byte array including the requested operation and the user identification to create a verification byte array hash; and verify that the operation requested in each message is authorized for the user identification when: each bit position of the verification byte array hash has a "1" in the corresponding bit position of an access Bloom Filter, the access Bloom Filter prepopulated with authorized operations permitted for the user identification; and each bit position of the verification byte array hash has a "1" in the corresponding bit position of a challenge Bloom Filter, the challenge Bloom Filter prepopulated with authorized operations not requiring a challenge. Then, the software instructions for the processor to verify that the operation requested in each message is authorized for the user identification may include instructions for the processor to: when each bit position of the verification byte array hash does not have a "1" in the corresponding bit position of a challenge Bloom Filter, send a second challenge packet to the MTU via the communication network interface address space, the second challenge packet including a second nonce; hash a re-authentication byte array including the second nonce and the pre-shared secret value for the user identification to create a re-authentication byte array hash; in response to receiving a challenge response packet from the MTU via the communication network interface address space, re-authenticate the user identification when a packet hash of the challenge response packet matches the re-authentication byte array hash; and verify that the operation requested in the message is authorized for the user identification when the user identification is re-authenticated.

The software instructions for the processor to verify that the operation requested in each message is authorized for the user identification may include instructions for causing the processor to: in response to receiving a communication message with an authenticated user identification, and when the authenticated user identification is an administrator user identification, send a second challenge packet to the MTU via the communication network interface address space, the second challenge packet including a second nonce; hash a re-authentication byte array including the second nonce and the pre-shared secret value for the user identification to create a re-authentication byte array hash; and verify that the operation requested in the communication message is authorized for the user identification in response to receiving a challenge response packet from the MTU via the communication network interface address space when a packet hash of the challenge response packet matches the re-authentication byte array hash.

Other features and advantages of the invention will be set forth in, or apparent from, the detailed description of exemplary embodiments of the invention found below.

BRIEF DESCRIPTION OF THE SEVERAL VIEWS OF THE DRAWINGS

FIG. 17 is a table of extended Modbus function codes.

FIG. 18 is a schematic diagram of an exemplary connection request packet according to the invention.

FIG. 19 is a schematic diagram of an exemplary challenge packet according to the invention.

FIG. 20 is a schematic diagram of an exemplary challenge response packet according to the invention.

FIG. 28 is a flow diagram of an exemplary process to check a packet to determine if a requested function requires a challenge or a connection request.

DETAILED DESCRIPTION OF EXEMPLARY EMBODIMENTS OF THE INVENTION

A. Security Hardening of Network Devices

In the exemplary embodiments described herein, a microkernel is used in securing network devices, such as field devices in SCADA systems. While field devices in SCADA systems are used as examples of network devices requiring securing, it should be understood that such field devices are exemplary and that the scope of the invention is set forth in the claims which follow hereafter.

Reducing the size of the kernel reduces vulnerabilities. Less lines of code means that there are fewer possibilities for the kids of errors that introduce vulnerabilities. A smaller kernel also means the kernel itself is less complicated, making it more likely that vulnerabilities are not unknowingly introduced. Finally, only for small kernels is formal analysis possible. For instance, if one can access the OS, any memory location can be written to, even if that memory address is actually memory mapped I/O that sets a field device output to a value that is different from the value that the control application intends. Thus, the operating system is always responsible for enforcing security.

The microkernel provides partitioning of address spaces or address bases. As used herein, "address spaces" are logical units of memory that are separated or isolated from each other.

Also, as used herein, "threads" are execution units (threads are followed to determine what the next instruction is then going to be loaded into the processor).

Further, as used herein, "interprocess communication" (IPC) is communication between different threads, in the same and different address spaces. A thread in one address base is interfaced into another address base through the operating system's IPC mechanism. That interprocess communication is the point at which the security features of the device are inserted.

The microkernel also provides partitioning of execution time by processes or threads of a microprocessor, so that no process can monopolize the microprocessor and no process can access address bases unrestricted, as described in more detail below.

Still further, as used herein, the phrase "trusted computing base" means the software and hardware that is responsible for enforcing security in that network device. Elements that are required to work correctly in order for security to be enforced are part of the trusted computing base. For many systems, the trusted computing base includes the operating system, and may also include hardware, for example, a trusted platform module (TPM).

In the exemplary embodiments of a security enhanced network device disclosed herein, TCP/IP and other drivers are located outside of the operating system kernel because they are places of vulnerabilities (i.e., if there is a vulnerability in a driver, if that driver is in the OS, once that driver is compromised, an attacker has free access to the entire system because they are executing in the operating system's privilege mode).

Figure 1:
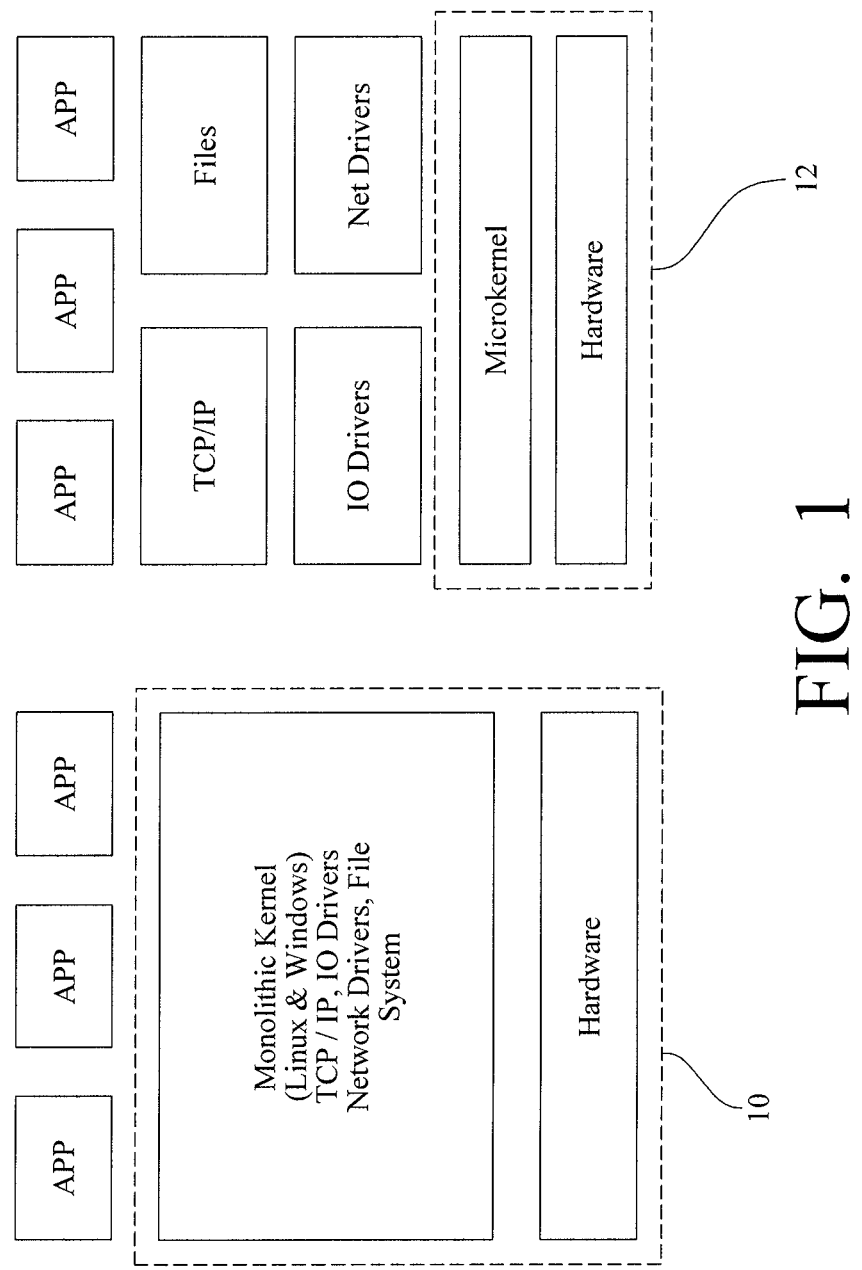
FIG. 1 is a schematic diagram comparing a monolithic kernel architecture and a microkernel architecture.
Figure 2:
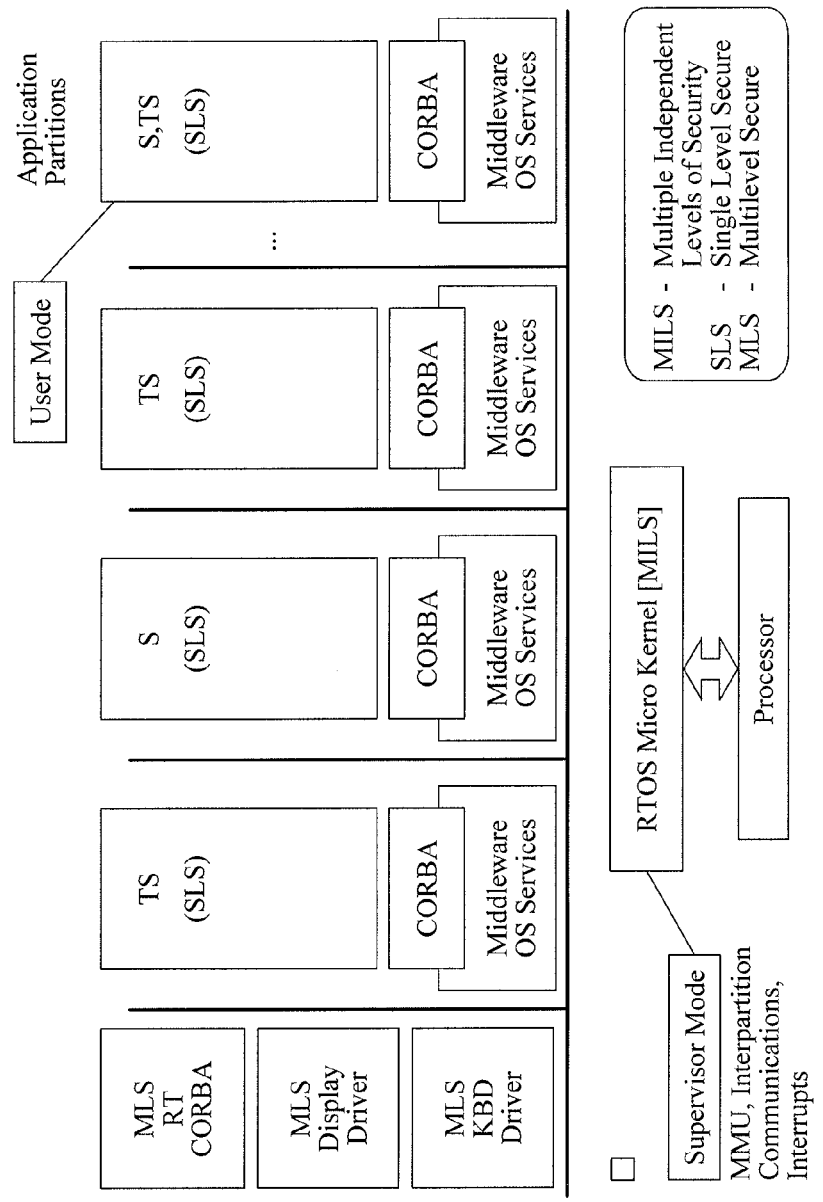
FIG. 2 is a schematic diagram of a MILS security architecture.
Figure 3:
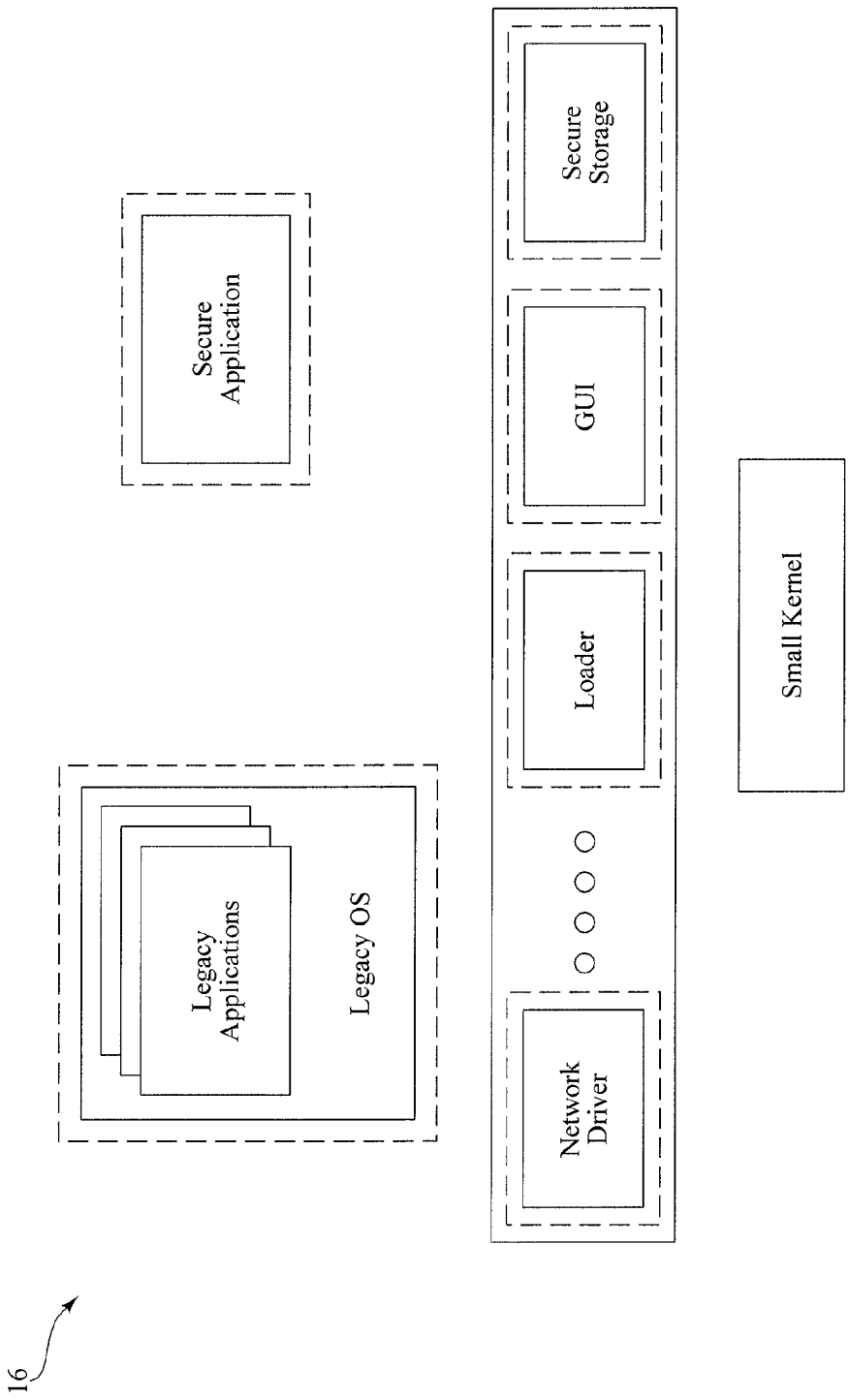
FIG. 3 is a schematic diagram of a Nizza security architecture.
Figure 4:
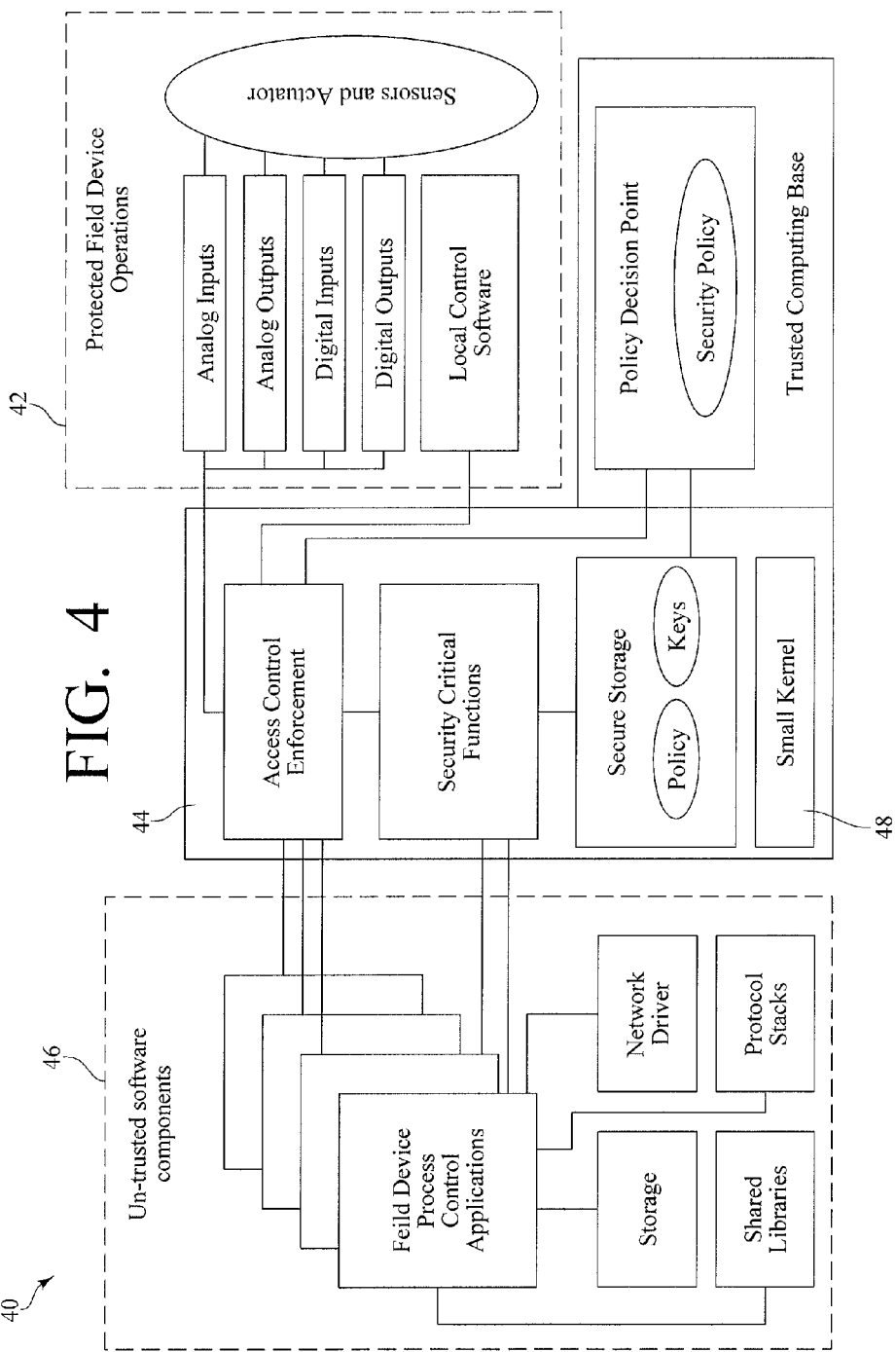
FIG. 4 is a functional block diagram of an exemplary reduced kernel, small TCB hardened field device for DCS.

FIG. 4 is a functional block representation of an exemplary reduced kernel, small TCB security-hardened filed device 40 for DCS.

A microkernel 48 provides the ability to create separate address spaces and threads of execution (or processes). More specifically, the microkernel 48 provides partitioning between a protected operations address space 42, a security enforcement address space 44, and a communication address space 46. The microkernel 48 enforces isolation between these address spaces. By isolation it is meant that each independent address space can only access specific physical resources (via memory) to which it is assigned at design or boot time, and this isolation is unalterable by any address space. The microkernel 48 provides the ability for one or more threads of execution in each address space. Thus there are executing "processes" in each address space. The microkernel 48 enforces a partitioning of the processor use by each thread or address space. As mentioned above, partitioning of execution time means that specific threads, and therefore specific address spaces, can be allotted a limited about of execution time, such that no thread or address space can obtain permanent control of the processor. Finally the microkernel 48 provides the ability for communication between threads in the same address space and in different address spaces. More importantly, the microkernel mediates all communication between processes or threads, and so can prevent threads in one address space from communicating with threads in another address space, and allows the system designer to specify a priori which threads or address spaces are allowed to communicate. The identity of the sender of an inter-process communication is provided to the receiver by the microkernel 48, and therefore cannot be forged.

The communication address space 46 contains all external facing communications hardware and software components. This includes: physical resources associated with the network hardware, the driver for that network hardware, and the protocol stacks for supported SCADA communications. The communication address space 46 is isolated, and the microkernel 48 allows threads are in the communication address space 46 to communicate only with threads in the security enforcement address space 44.

The security enforcement address space 44 contains security related software components, including security critical functions and secure storage of security policy information and security secrets or keys. The security enforcement address space 44 and the microkernel 48, together, make up the trusted computing base (TCB) for the field device 40.

It should be noted that in FIG. 4, the microkernel 48 is included in the TCB, but from an address space perspective, the microkernel 48 lies outside the address spaces 42, 44, 46.

The microkernel 48 mediates communication between threads in the security enforcement address space 44, and the communication address space 46 and the protected operations address space 42.

The protected operations address space 42 contains the physical resources that provide analog and digital I/O to physical device and elements, such as sensors and actuators, associated driver software, and a simple interface that allows threads in the security enforcement address space 44 to read and write analog and digital I/O values. If the field device is "intelligent" and is able to carry out local control on its own, associated local control software is located in the protected operations address space 42.

In FIG. 4, the separate address spaces, limited inter-process/inter-address space communication, and microkernel create isolation between: (i) critical field device resources and operations, such as analog and digital input/output, via the protected operations address space 42; (ii) security critical data and code (e.g., cryptographic keys and cryptographic operations) in the security enforcement address space 44; and (iii) network-connected field device applications in the communication address space 46. This enables the critical field device resources and operations to continue to execute even when network components are attacked. Furthermore, in the event of a network based attack, only resources in the communication address space 46 are possibly compromised. When threads, malicious or benevolent, in the communication address space 46 communicate with threads in the security enforcement address space 44, security measures continue to be enforced, as the identity of threads in the security enforcement address space 44 communicating with threads in the communication address space 46 is provided by the microkernel 48. If a thread in the communication address space 46 is granted specific privileges, such as the privilege to change and analog output value, that privilege persists for a limited duration, specified by the security policy, and/or possibly by a SCADA protocol specification. For safety or security critical operations, this duration is limited to the amount of time taken to carry out the operation, and no more. If the thread requests to carry out the operation again, the thread must re-authenticate. Security keys required for re-authentication are not stored in the communication address space 46, and are inaccessible to a malicious thread in that address space. For an individual thread in the communication address space 46, security is enforced by threads from the security enforcement address space 44. Specifically, association of a thread in the communication address space 46 with authentication credential is done by a thread in the security enforcement address space 44. This approach also isolates the security critical functions (data and code) in the security enforcement address space 44 in a separate compartment where they are protected from unauthorized access by a compromised thread in the communication address space 46. Field device integrity is further enhanced by a role based access control policy the separates the privileges between different roles, specifically between different engineering roles and different operator roles.

Figure 5:
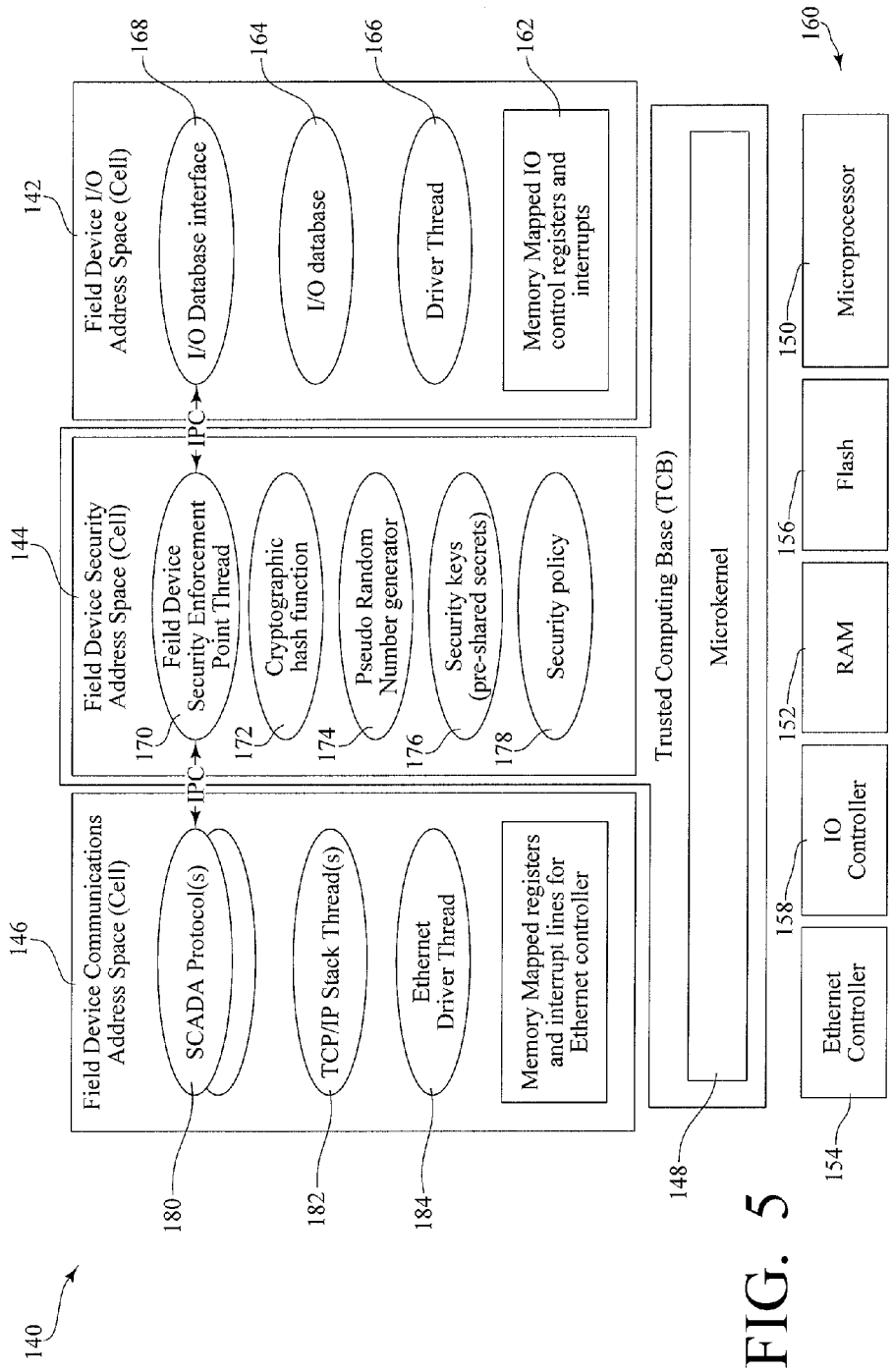
FIG. 5 is a schematic diagram of an exemplary security enhanced network device according to the invention.

FIG. 5 is a schematic representation of an exemplary security enhanced network device 140, such as a field device of a SCADA system, including a microkernel 148 that provides a partitioning between a protected operations address space 142, a security enforcement address space 144, and a communication address space 146. The network device 140 also includes a microprocessor 150, a memory 152 (RAM), a communication controller 154 (Ethernet controller), a flash memory 156, and an IO controller 158, all operably connected to form a processing device 160, upon which the microkernel 148, the protected operations address space 142, the security enforcement address space 144, and the communication address space 146 operate.

Analog and digital IO hardware is connected to the network device by the IO controller 158. The IO controller 158 and control registers 162 are mapped into the protected operations address space 142. A thread in the protected operations address space 142 operates the IO controller 158, collects values of connected analog and digital inputs, and updates their values in an IO database 164, a shared memory section within the protected operations address space 142. An IO driver thread 166 also checks for changes in analog or digital output values in the IO database 164, and writes the values to the connected analog and digital outputs through the IO controller 158. An IO database interface thread 168, listens for IPC communications only from a field device security enforcement point thread 170. IPC communications from the field device security enforcement point thread 170 are either requests for values stored in the IO database 164, or requests to change values stored in the IO database 164. The IO database interface thread 168 fulfills these requests. Resources in the protected operations address space 142, specifically the control registers 162 of the IO controller 158 and the IO database 164, cannot be accessed by threads other than through the security enforcement address space 144.

In the security enforcement address space 144, a cryptographic hash function 172 and a pseudo random number generator 174 provide needed security functions to authenticate requests that come through the communication address space 146. Security keys or pre-shared secrets 176 are stored in the security enforcement address space 144, where they cannot be accessed or modified by threads in the communication address space 144.

SCADA protocol thread(s) 180 interface with a control network through the Ethernet controller 154 by communicating through a TCP/IP stack thread(s) 182 and a Ethernet driver thread 184, all contained within the communication address space 146. Using IPC, the SCADA protocol thread(s) 180 communicate with the field device security enforcement point thread 170.

The field device security enforcement point thread 170 accepts requests for IO data reads and writes on behalf of the IO database interface thread 168. If the SCADA protocol thread 180 is currently assigned the permission associated with the request, then the field device security enforcement point thread 170, makes the appropriate request to the IO database interface thread 168 and forwards the response back to the requesting SCADA protocol thread 180. If the SCADA protocol thread 180 is not currently assigned the privilege associated with the request, then the field device security enforcement point thread 170 and the SCADA protocol thread 180 must negotiate an authentication.

The authentication makes use of the cryptographic hash function 172 and a value generated by the pseudo random number generator 174. Additional data to be included in the hash can be supplied by the SCADA protocol thread 180, allowing the SCADA protocol thread 180 to implement, possibly multiple, security schemes described by different SCADA protocols but without security functions and keys being present in the communication address space 146. If the security negotiation is successful, and the appropriate permission is now associated with SCADA protocol thread 180, then the request is forwarded by the field device security enforcement point thread 170 to the IO database interface thread 168. A security policy thread 178 dictates the assignment of privileges to threads based on the role of user authenticated and criteria such as time of day, day of the week, and current mode of operation. The duration the permission is assigned to the thread is defined by the security policy thread 180.

In the exemplary network device 140, processor time is portioned between each address space. Time partitioning prevents any thread from starting a process and never releasing the processor 150. Time partitioning works through priorities and privileges (i.e., scheduler functionality). By setting priorities, threads in communication address space 146 can never monopolize the processor 150. Three vertical levels, high priority items, medium priority items and low priority items, are established in a scheduler. The higher priority items are always serviced first (e.g., there is typically a control algorithm on the network device 140 that is actually doing some computations and controlling the and actuators of the device and reading the sensors of the device). All other threads are forced to operate in the background, particularly any processes that would be initiated in the communication address space 146. A signal comes in, is handled, but then the data just sits until the processor 150 has time to actually determine the request kind Regardless of what kind of request it is, the request is always going to be given a lower priority than the control algorithm.

Figure 6:
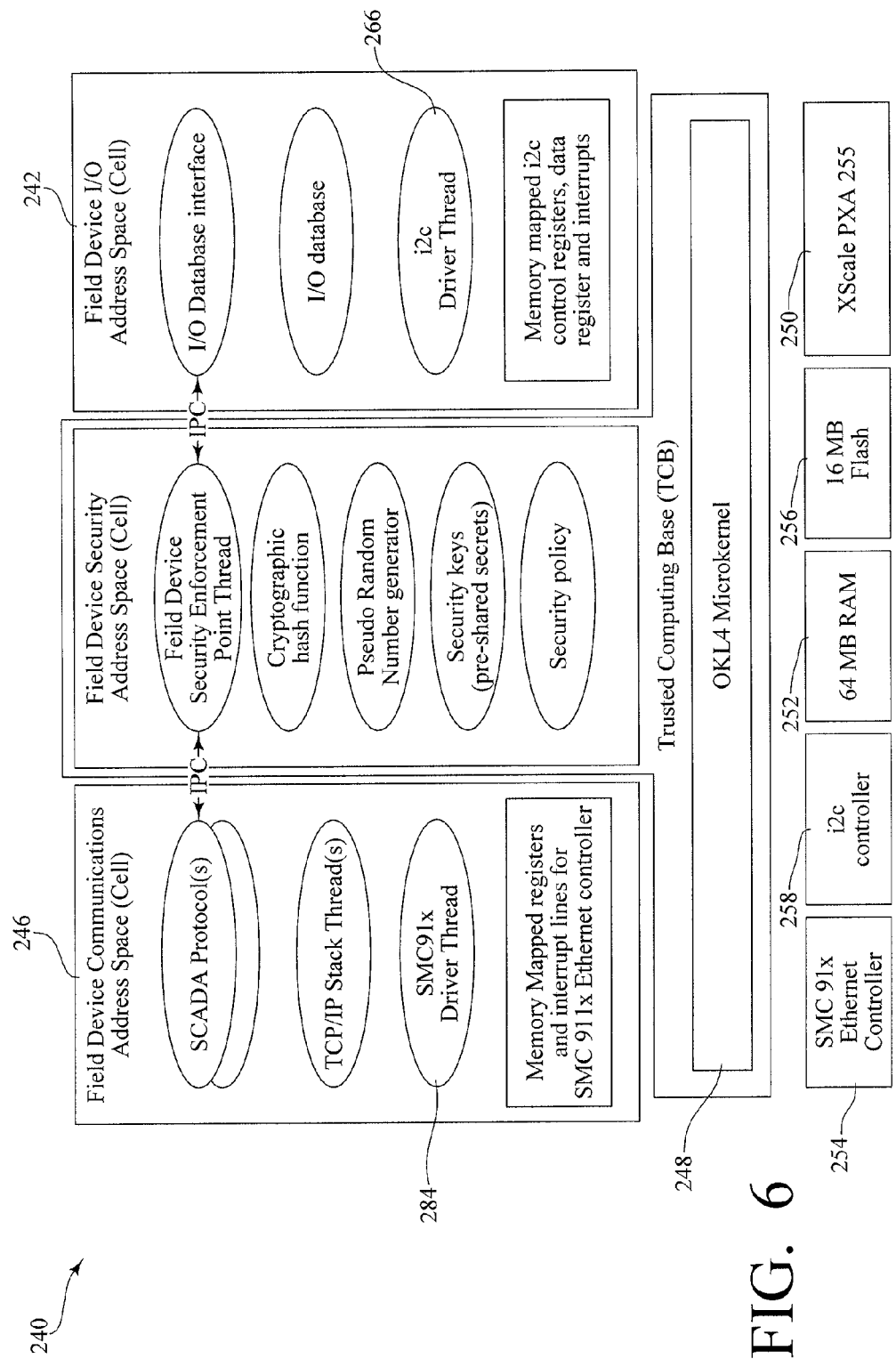
FIG. 6 is a schematic representation of another exemplary security enhanced network device.

FIG. 6 is a schematic representation of another exemplary security enhanced network device 240 (an exemplary development platform implementation of a prototype security-hardened field device) substantially in accordance with the exemplary security enhanced network device 140 of FIG. 5. In the network device 240 of FIG. 6: a microkernel 248 is an OKL4 microkernel; a microprocessor 250 is an XScale PXA 255 Processor, a memory 252 is a 64 MB RAM, and an Ethernet controller 254 is a SMC 91X Ethernet controller operated by a SMC 91x driver thread 284 in a communication address space 246. Additionally, a flash memory 256 is a 16 MB flash memory, and an IO controller 258 is an i2c controller operated by an i2c driver thread 266 in a protected operations address space 242. The other elements of the exemplary network device 240 are substantially the same as the corresponding elements in the exemplary network device 140 of FIG. 5.

Figure 7:
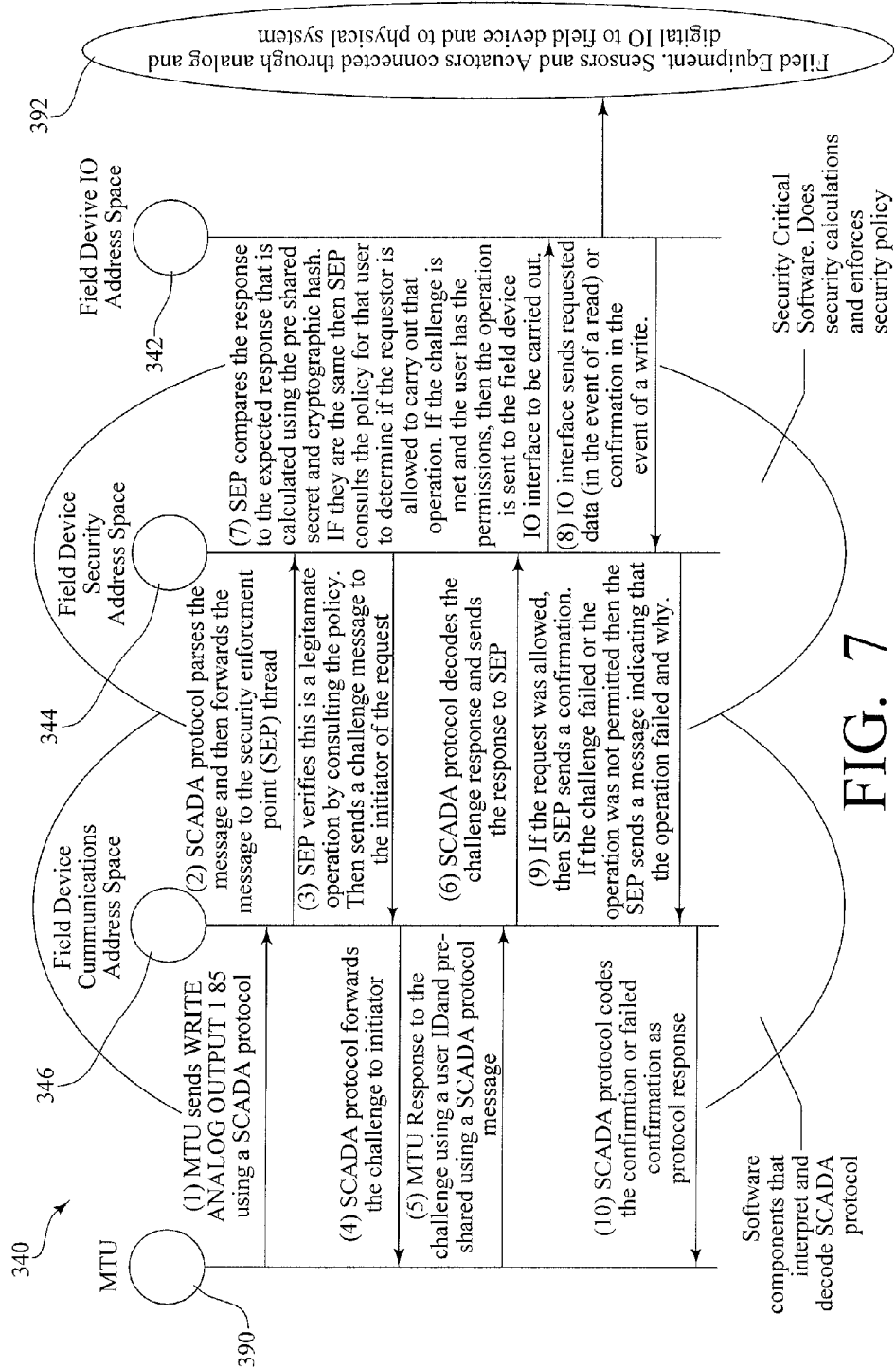
FIG. 7 is a call flow diagram of exemplary communication between a Master Terminal Unit and the elements of a typical Security Hardened Field Device.
Figure 8:
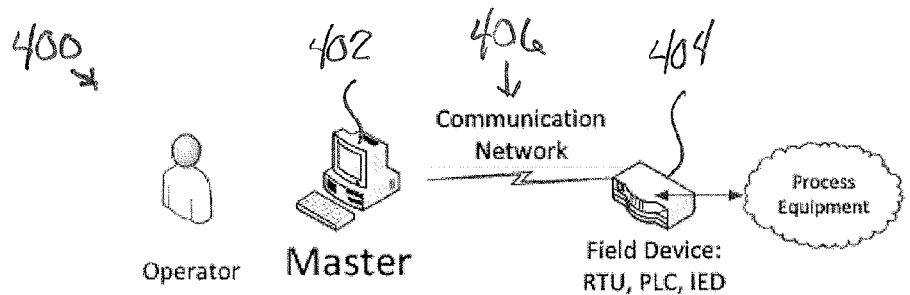
FIG. 8 is a schematic diagram of the main elements of a simple SCADA system.

FIG. 7 is a call flow diagram of exemplary communication between a Master Terminal Unit (MTU) 390 and the elements of a typical Security Hardened Field Device (SHFD) 340 as described above. When in place in a typical SCADA setting, the SHFD 340 interfaces with the SCADA communications network and field equipment 392 (sensors and actuators) through analog and digital IO lines.

The MTU 390 (at the request of a human operator) initiates a control message (1), for example: WRITE ANALOG OUTPUT 185. This message is encoded using SCADA protocol, such as DNP3 or MODBUS. The SCADA message is then wrapped in TCP/IP for transport to the SHFD 340 (RTU) via a network that supports TCP/IP (commonly Ethernet within a plant). The message (1) initially arrives through a hardware network interface, which is controlled by a software driver. The driver decodes the message (1) and passes it to a TCP/IP stack, which delivers to a SCADA protocol thread (e.g., FIG. 5, element 180) in a communication address space 346, just the SCADA protocol message.

The SCADA protocol thread then converts the message into a device specific message (2). The SCADA protocol thread cannot directly carryout the request, as it has no access to the IO Database interface thread (e.g., FIG. 5, element 168) in a protected operations address space 342. Instead the SCADA protocol thread forwards the parsed message (2) to a security enforcement point thread (e.g., FIG. 5, element 170) in a security enforcement address space 344. Continuing with the example, the parsed message (2) is to change analog output 1 to 85. The security enforcement point thread first verifies this is valid and legal operation. If it is not, it sends an error message (not shown) back to the SCADA protocol thread.

If the request is valid and legal, then the security enforcement point thread responds with a challenge message (3). The challenge message (3) is an authentication request, and the challenge message (3) includes a random nonce value generated by the security enforcement point thread.

The SCADA protocol thread then codes a challenge message (4) for the specific SCADA protocol. For example, DNP3 already has a challenge response authentication specification. For protocols without such specification, it is necessary to add a challenge procedure to the protocol specification.

The challenge message (4) is then delivered to the MTU 390, and possibly to an HMI, where the initiator of the request generates a challenge response message (5) using a pre-shared secret that they possess and the nonce value generated by the security enforcement point thread. The message is then coded as a SCADA protocol message, sent to the field device, and decoded by the SCADA protocol thread.

The SCADA protocol thread then forwards a as response message (6) to the security enforcement point thread. The security enforcement point then compares the response to its expected response, using the local cryptographic hash functions and pre-shared secret. If the response matches then the requestor is considered authenticated, and the user id of the requestor is associated with the user id the initial request. A security policy (FIG. 5, element 178) is then consulted to determine if the requestor (user id) has permission, according to the security policy, to carry out the operation.

If the requestor has permission, then the security enforcement point thread sends an appropriate operation message (7) to the IO database interface thread, if not an error message is returned to the SCADA protocol thread.

After completion of the IO transaction, the IO database interface thread returns a message (8) to the security enforcement point thread, which returns a message (9) to the SCADA protocol thread, which returns a message (10) to the MTU 390.

In the event of a malicious user discovering and exploiting a vulnerability in the network driver thread software, the TCP/IP stack thread(s), or the SCADA protocol thread(s) (which is likely 10 or 100's of thousands of lines of code) the malicious user cannot access the database interface thread, the IO Database, or the IO driver thread, as these are not in the communication address space 346. Furthermore, the malicious user cannot modify the cryptographic hash functions, random number generator, or read or modify the security keys. Thus the critical operations of the field device are protected. Restarting the communication address space (from known good write one read many location) could then restore the communication address space to operational status.

B. Device, Method, and System for Processing Communications for Secure Operation of Industrial Control System Field Devices The following description of exemplary device(s), method (s), and system(s) for processing communications for secure operation of industrial control system field devices utilizes and applies the principles described above with respect to security hardening of network devices.

As used herein, the technology referred to as "software verification" is as follows: to be able to use exhaustive testing or a mathematical structure so as to show that the software handles every input/output combination, that there are no unspecified input/output combinations, and that the output combinations correspond to some predefined specification for each input combination. In other words, software verification verifies the software so that nothing is left to chance. While complex, verification is a one-time process.

The Field Device Security Pre-Processor (FD-SPP) is an in-line device to provide cyber-security to field devices. The FD-SPP is placed in front of a field device by connecting the communication network interface to the FD-SPP and then connecting the FD-SPP to the field device. At the Master, a software component on the Master or hardware device very similar to the FD-SPP will work with the FD-SPP to implement cyber-security.

Figure 9:
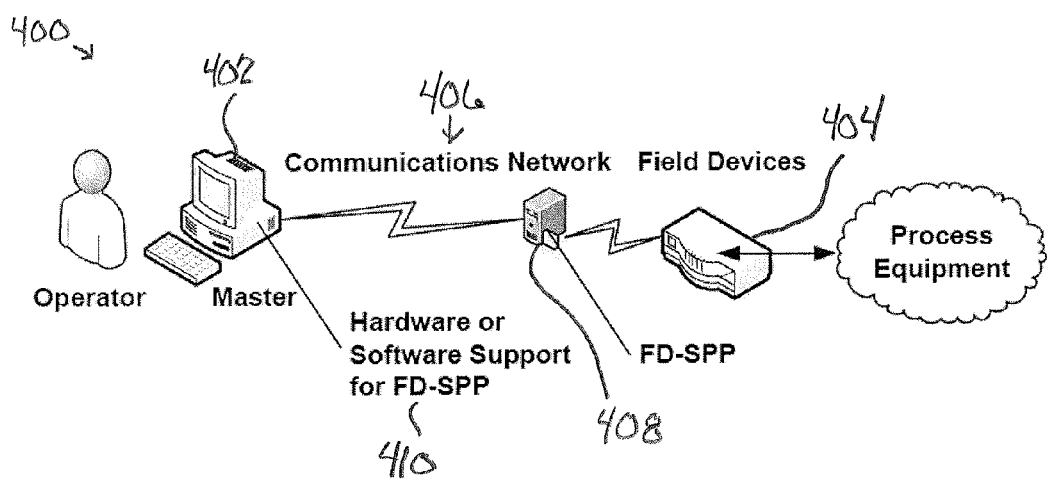
FIG. 9 is a schematic diagram of the elements of an exemplary system for processing communications for secure operation of an industrial control system field device, according to the invention.

FIG. 9 shows the placement of a FD-SPP 408 in the simple SCADA system 400 initially described above, including the Master 402 (i.e., the Master Telemetry Unit (MTU)/Human Machine Interface (HMI)), the field device 404, and the communication network 406. The FD-SPP 408 is placed in front of the field device 404 by connecting the communication network 406 to the FD-SPP 408 and then connecting the FD-SPP 408 to the field device 404. At the Master 402, a support component 410, which can be either hardware or software, will work with the FD-SPP 408 to implement cyber-security.

Figure 10:
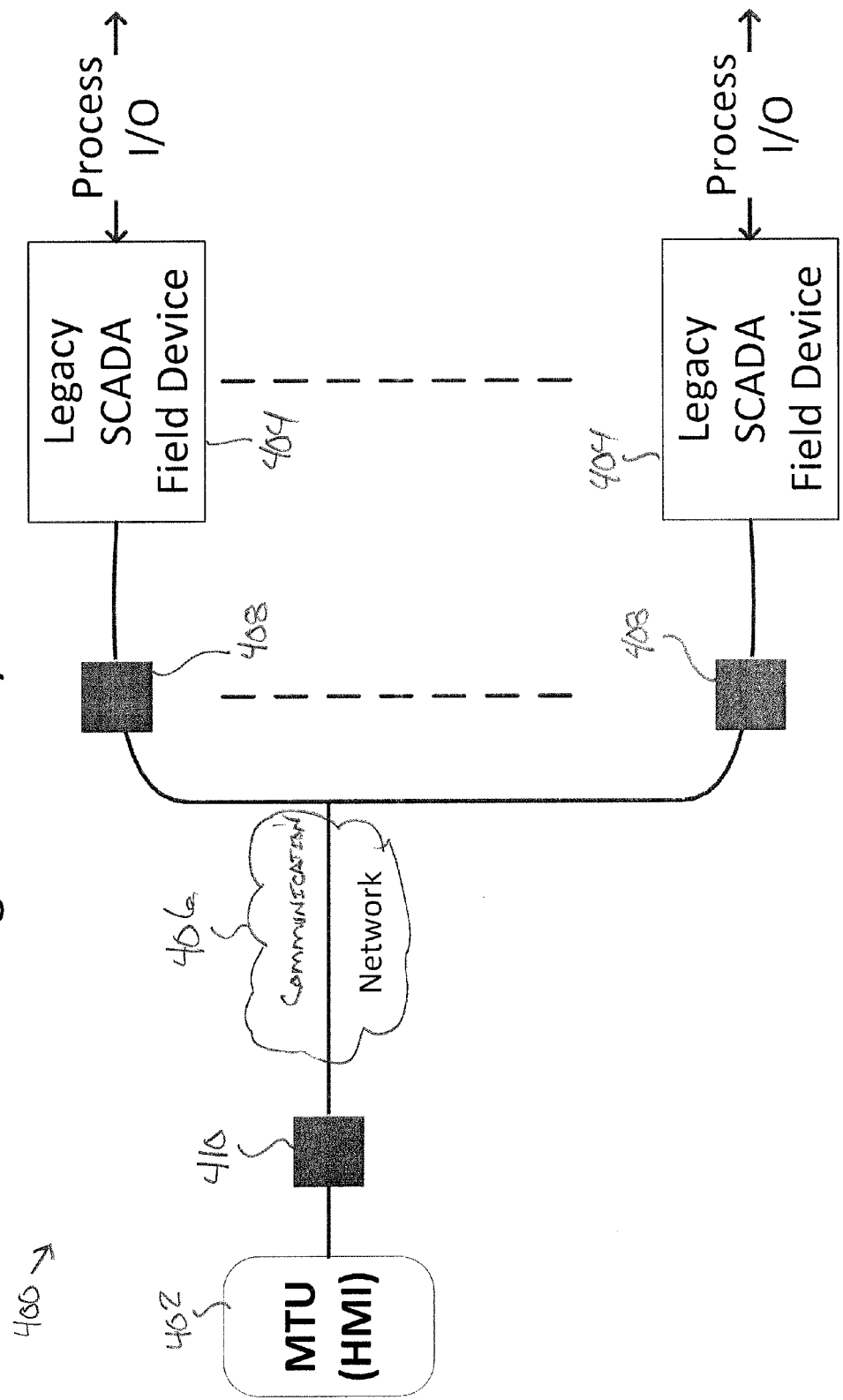
FIG. 10 is an schematic diagram of an alternate exemplary system according to the invention.

FIG. 10 shows an alternate simple SCADA system 400 including the Master 402, field devices 404a, 404b, communication network 406, FD-SPPs 408a, 408b, and the support component 410.

The FD-SPP(s) 408 adds authentication and authorization (role based access control) to the field device(s) 404. Both of these features are not part of standard SCADA protocols or typical SCADA systems. Authentication verifies that the sender of a SCADA message (an operator for example). The FD-SPP 408 uses a challenge response process, and required pre-shared secrets are part of an initial configuration of the SCADA system 400. Authorization prevents a user from carrying out an authenticated operation which the user is not authorized to do. Operators, engineers, vendors, other maintenance personnel, and other individuals need varying levels of access to resources (services) offered by field device(s) 404 (such as an RTU). Limiting allowed operations supports the principle of least privilege and improves security. The FD-SPP 408 uses role based access control to improve management of user privileges and to allow for constraints such as: separation of duty, static mutually exclusive roles, and dynamic mutually exclusive roles.

The FD-SPP 408 is a small network device, with an embedded system on a chip microcontroller. The FD-SPP 408 can support many different types of communication links. Advantageously, the FD-SPP 408 does not use full link level encryption. Therefore, the FD-SPP 408 incurs less computational overhead and can be implemented with less resources, making it faster and cheaper than devices using full link level encryption. The components and interconnections of the components are substantially as described above with respect to the security enhanced network device 140 (FIG. 5) and 240 (FIG. 6), but configured to be placed in front of a field device 404 by connecting the communication network interface to the FD-SPP 408 and then connecting the FD-SPP 408 to the field device 404. The basic architecture of the FD-SPP 408 is also described below with respect to FIG. 11 and FIG. 12.

What is unique about the FD-SPP 408 and what makes it better than competing technologies is that it is a certified high-assurance device. Any in-line device that provides cyber-security for field equipment also has the potential to introduce new cyber-vulnerabilities by adding new attack surfaces. Instead of attacking field devices directly, an attacker could direct an attack at the in-line device. If the in-line device uses a commercial OS, such as Windows or Linux, then the OS, drivers, or network stacks, could be attacked. These attacks may be challenging to carry out, but using any macro kernel based OS (both Windows and Linux) makes assurance that such attacks cannot succeed impossible. To address this issue the FD-SPP 408 adapts the security hardened field device architecture described above to an in-line device for securing legacy devices.

There are two specific strengths that come from using this architecture. First the hardened field device architecture significantly decreases the vulnerability potential of the FD-SPP 408 by isolating the network related software, including device drivers, from security enforcing code and data as well as field side devices. Second, the architecture makes it possible for formal verification of the security operations of the device.

Figure 11:
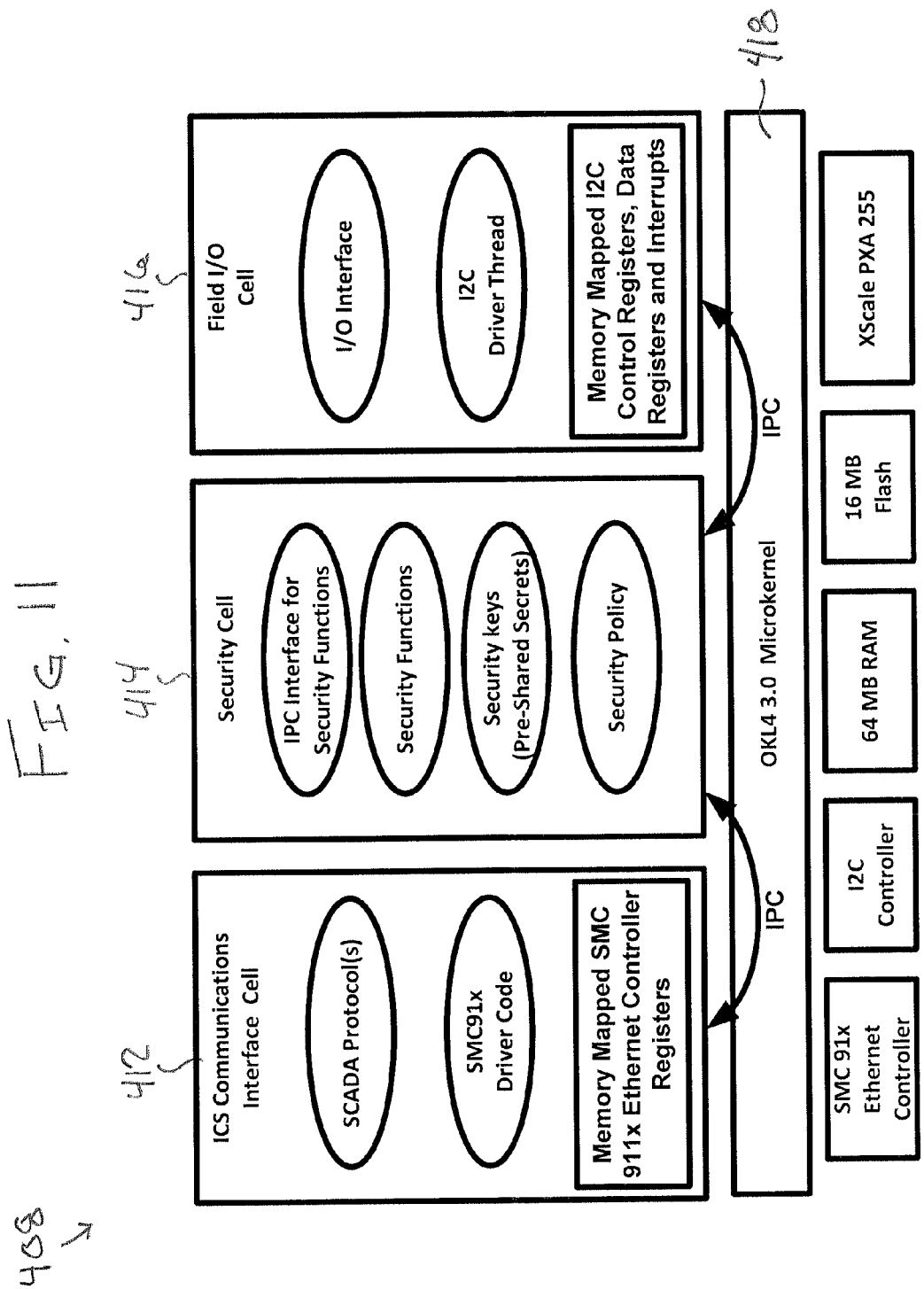
FIG. 11 is a schematic representation of the architecture of an exemplary Field Device Security Pre-Processor device, according to the invention.

FIG. 11 shows how the architecture is used in an exemplary FD-SPP 408. There are three isolated cells or address-spaces, a communications network interface address space 412 (i.e., communication address space), a security cell address space 414 (i.e., security enforcement address space), and a field device interface address space 416 (i.e., protected operations address space). Interaction between these isolated compartments is strictly controlled by a microkernel 418, in this exemplary embodiment an OKL4 microkernel. As mentioned above, a more detailed description of the architecture, including the hardware level components, is found above with respect to the description of FIG. 5 and FIG. 6.

The architecture isolates networking facing software components, including device drivers and network stacks, from security enforcing software components and field equipment interfaces and drivers. It achieves this by moving the security related components (security keys, security functions and security policy (enforcement routines)) into the security cell address space 414 provided and isolated by the microkernel 418. The network facing software components are grouped together in the communications network interface address space 412. Finally critical field device resources (analog and digital IO) and operations on these resources are isolated in the field device interface address space 416. Communication between the network facing software components and the critical field device resources is prohibited. Network facing software components are only allowed to communicate with the security related components. This creates a two level scheme for securing the field device. Defined security, including policy, keys, and functions is provided by specific elements in the security cell address space 414. Isolation of the address spaces from each other prevents vulnerabilities in application software from allowing an attacker to modify or by-pass security. The amount of code that must be trusted (the TCB or trusted computing base) is significantly reduced in this architecture. Due to the central role of the operating system in security enforcement, a microkernel is used by the architecture to minimize the amount of OS code in the TCB. The microkernel 418 provides only a memory abstraction (an address space), an execution abstraction (threads), and inter process communication (IPC). The microkernel 418 must provide strong assurance (preferably formal verification) that unspecified interaction between address spaces cannot happen, that IPC can be limited to specific threads, and that spoofing of IPC sender is not possible.

Utilizing a verified microkernel to handle communication ensures that a certain input and communication command will result in a certain output exactly as specified with nothing left to chance.

Authentication activities described herein for communications with industrial control systems can sit on top of such a verified microkernel, and the verification activities can themselves be verified as well.

Figure 12:
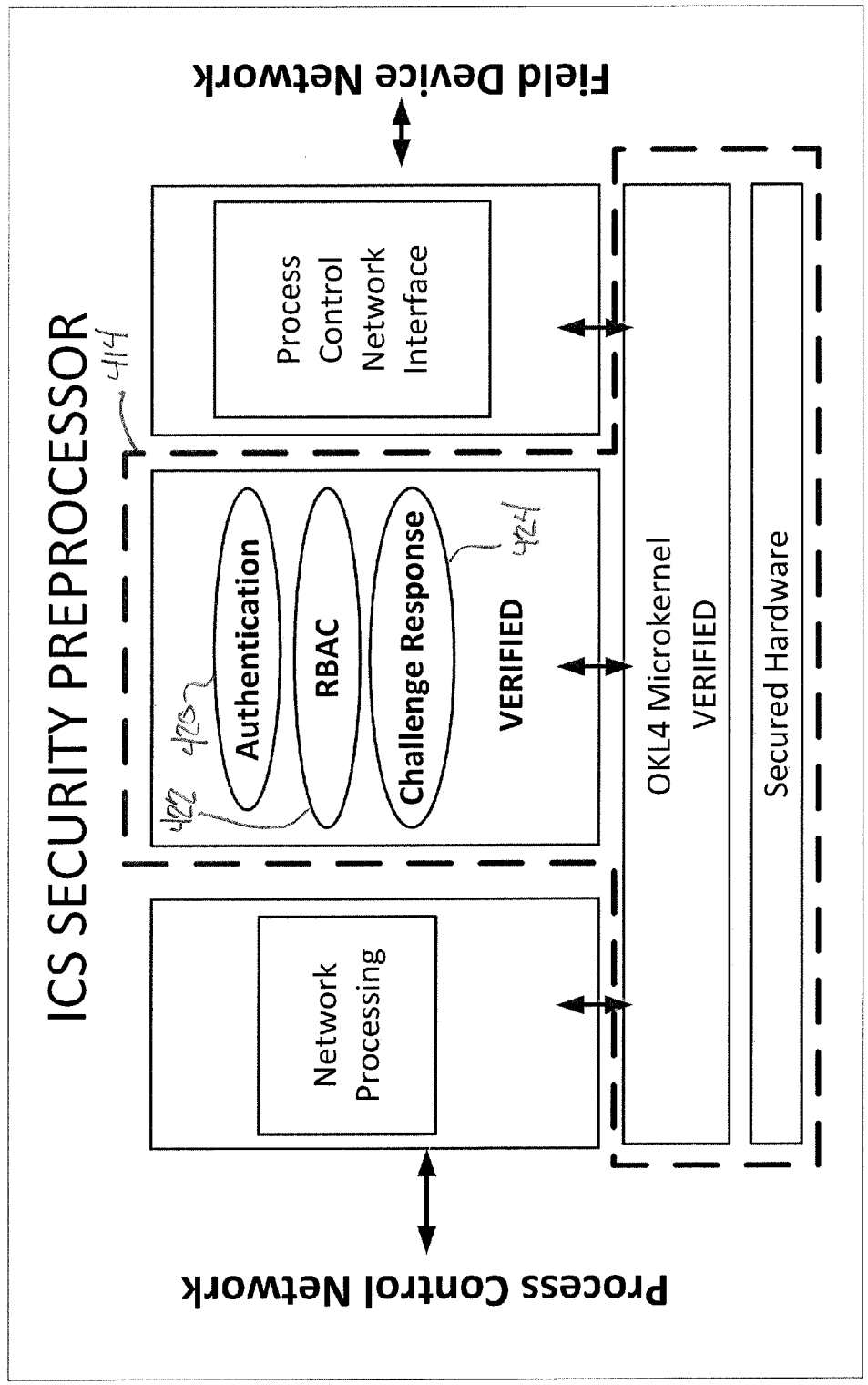
FIG. 12 is an alternate view of the architecture of an exemplary Field Device Security Pre-Processor device, according to the invention.

FIG. 12 is an alternate view of the architecture of the FD-SPP 408, showing functions of the security cell address space 414 in more detail. As shown in FIG. 12, the security cell address space 414 of the FD-SPP 408 includes software code/instructions for causing the processor to perform an authentication function 420, a Role Based Access Control (RBAC) function 422, and a challenge response function 424 to authenticate the sender and the sender's authority to carry out a function or operation request received from the communication network. Each of the functions is described below.

Modern SCADA systems use RS-232/485 serial communication, Ethernet, or various types of wireless communication between the MTU, RTU(s), and the HMI. Regardless of the communication channel, one of the primary protocols used legacy field devices for SCADA communication is the MODBUS protocol. There are other SCADA protocols that one of skill in the art will understand are equally subject to the inventive principles described and claimed herein. For the purpose of development and testing, Modbus was selected for field communications and is the SCADA protocol supported by the exemplary FD-SPP 408 described herein. Since many legacy devices use serial communications, the exemplary FD-SPP 408 supports RS-232 serial communications through a standard RS-232 connection.

Figure 13:
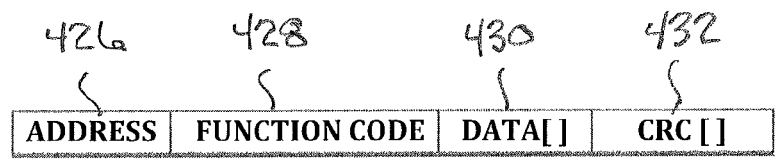
FIG. 13 is a schematic diagram of the basic structure of a Modbus message.

As shown in FIG. 13, the basic structure of a Modbus message includes the address 426 of the device the packet is intended for, a function code 428 to tell the device what to do, a series of data bytes 430, and error detection bytes 432 which are determined used cyclic redundancy check (CRC) algorithms. Function codes are predefined and specified in the Modbus protocol. Typical function codes include READ and WRITE coils and READ and WRITE registers.

Figure 14:
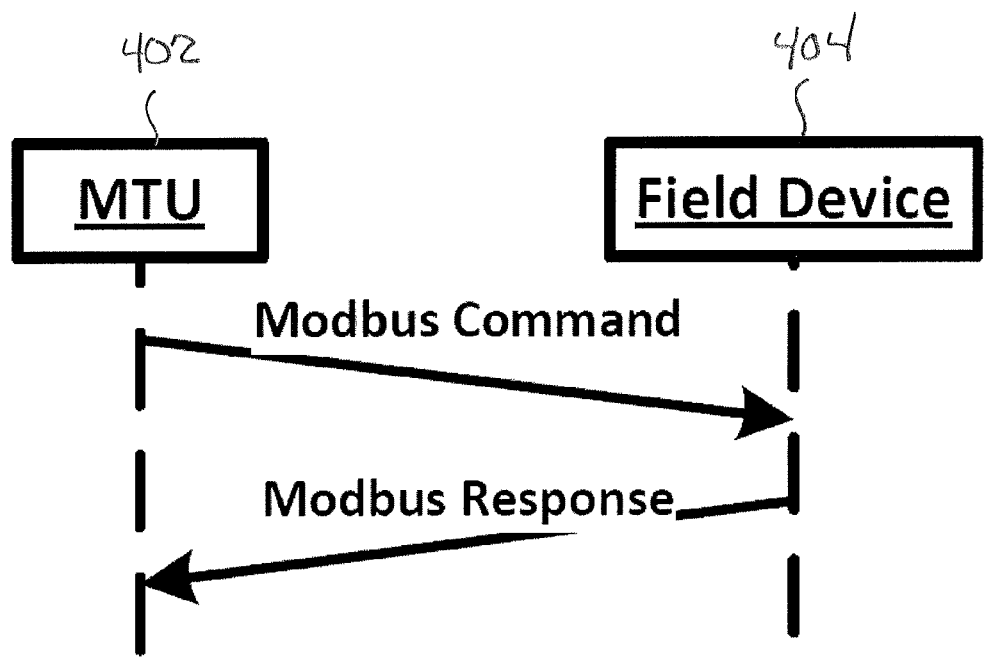
FIG. 14 is a call flow diagram of a sample Modbus exchange.

FIG. 14 shows a sample Modbus exchange.

To provide security, the software code/instructions of the security cell address space 414 of the FD-SPP 408 interacts with standard SCADA (Modbus) communications augmented with security elements that allow user authentication and authorization with Modbus messages.

The first required extension to Modbus is to add a user, and a user's secret. This user needs to authenticate (initially and periodically) when communicating with the RTU or legacy field device. Since the existing HMI software is used largely without modification, a user's information must be collected through some other means. For the example disclosed herein, this was achieved using a virtual serial device 410a implemented on the MTU 402. Assuming that existing HMI software talks to a serial device, installation of a virtual serial device 410a is one way to intercept Modbus messages after they leave the HMI but before they are transmitted to the field device 404. A similar result could be achieved using hardware. The virtual serial device 410a is installed on the MTU 402 and then the HMI software is configured to use the virtual serial device 410a, and the virtual serial device 410a connects to the actual serial device used by the HMI. The virtual serial device 410a includes a user interface, and when the virtual serial device 410a is first run it requests a username and secret from the user. The user ids and secrets are pre-stored permanently FD-SPP, and are updated as part of scheduled maintenance or system updates.

Figure 15:
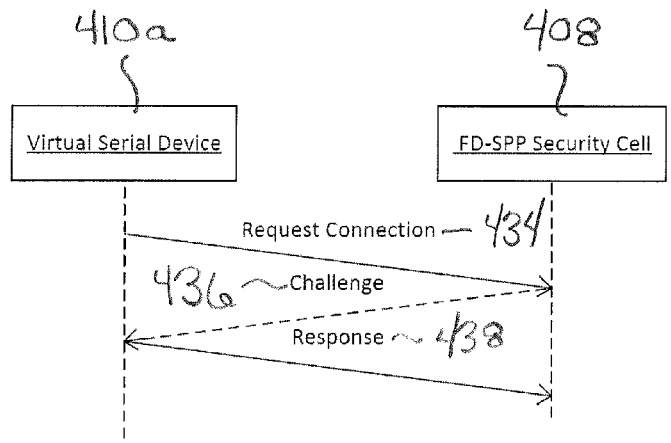
FIG. 15 is a call flow diagram of an exemplary extended Modbus protocol exchange utilizing the exemplary Field Device Security Pre-Processor device, according to the invention.

FIG. 15 shows the extended Modbus protocol of the FD-SPP 408. The extended Modbus protocol of the FD-SPP 408 includes a new function code, REQUEST CONNECTION 434, which includes the username in the data field to establish a connection with the FD-SPP 408. The FD-SPP 408 will then challenge this connection, using a second new function code, CHALLENGE 436. A final message from the HMI station uses the user's secret to calculate a hash-based message authentication code ("HMAC"). The HMAC is part of a Modbus message that uses the function code RESPONSE 438. A correctly calculated HMAC is interpreted by the FD-SPP as authenticating the user.

Figure 16:
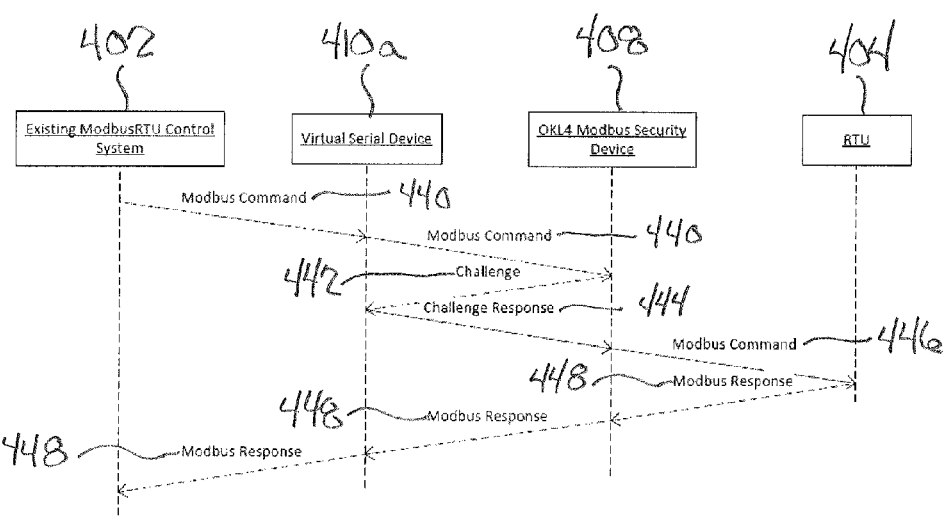
FIG. 16 is a call flow diagram showing a full command sequence utilizing the exemplary Field Device Security Pre-Processor device, according to the invention.

FIG. 16 illustrates a full command sequence. After the successful login the virtual serial device 410a will then begin passing packets from the existing control software to the FD-SPP 408, shown as message 440. Some, but not necessarily all, messages are challenged. When a message is challenged, the FD-SPP 408 detects the need to challenge the message, as part of its access control policy, discussed below. If the packets require a challenge, similar challenge 442—response 444 messages are exchanged between the virtual serial device 410a and the FD-SPP 408. If the response is accepted or the packet was not challenged, the Modbus message that originated with the MTU 402 is passed on to the RTU 404 (and the legacy field device), shown as message 446. A response message 448 from the legacy field device is then passed back from the FD-SPP 408 to the virtual serial device 410a to the MTU 402. If the response to the challenge is incorrect the packet will not be passed on, preventing anyone without the proper credentials from sending a Modbus packet.

FIG. 17 is a table 450 of extended Modbus function codes.

FIG. 18 shows the structure of a connection request packet 452. The connection request packet 452 was added as Function Code 40. This packet is responsible for sending the user id to the FD-SPP 408. The connection request packet 452 is always challenged by the OKL4 FD-SPP 408. The successful completion of this challenge means that the user has successfully logged in and all packets that are challenged will be checked with that user's secret. The issue of a new login request automatically logs out the previous user. Multiple users are not allowed to access the FD-SPP 408 at the same time.

FIG. 19 shows the structure of a challenge packet 454. The challenge packet 454 is sent from the FD-SPP 408 when a packet needs to be challenged or a user is logging in. This packet contains four 4 bytes of cryptographic nonce to be used as part of the hash for the response packet.

FIG. 20 shows the structure of a challenge response packet 456. The challenge response packet 456 is sent from the virtual serial device 410a as a response to receiving a challenge from the FD-SPP 408. This packet contains a hash of the original packet, the cryptographic nonce from the challenge, and the user's secret. This hash is discussed in more detail below.

In order to validate a challenge, the hash sent in the challenge response packet must match the hash calculated by the FD-SPP 408. This hash is preferably created using the SHA-256 hash algorithm. The packet that is being validated minus the CRC, the 4 bytes of cryptographic nonce, and the 8 bytes of secret are all combined into a single byte array and then hashed with SHA-256. The first 8 bytes are then sent to the FD-SPP 408 where they are compared with a hash calculated using the same process. If these two hashes match the challenge is validated.

Figure 21:
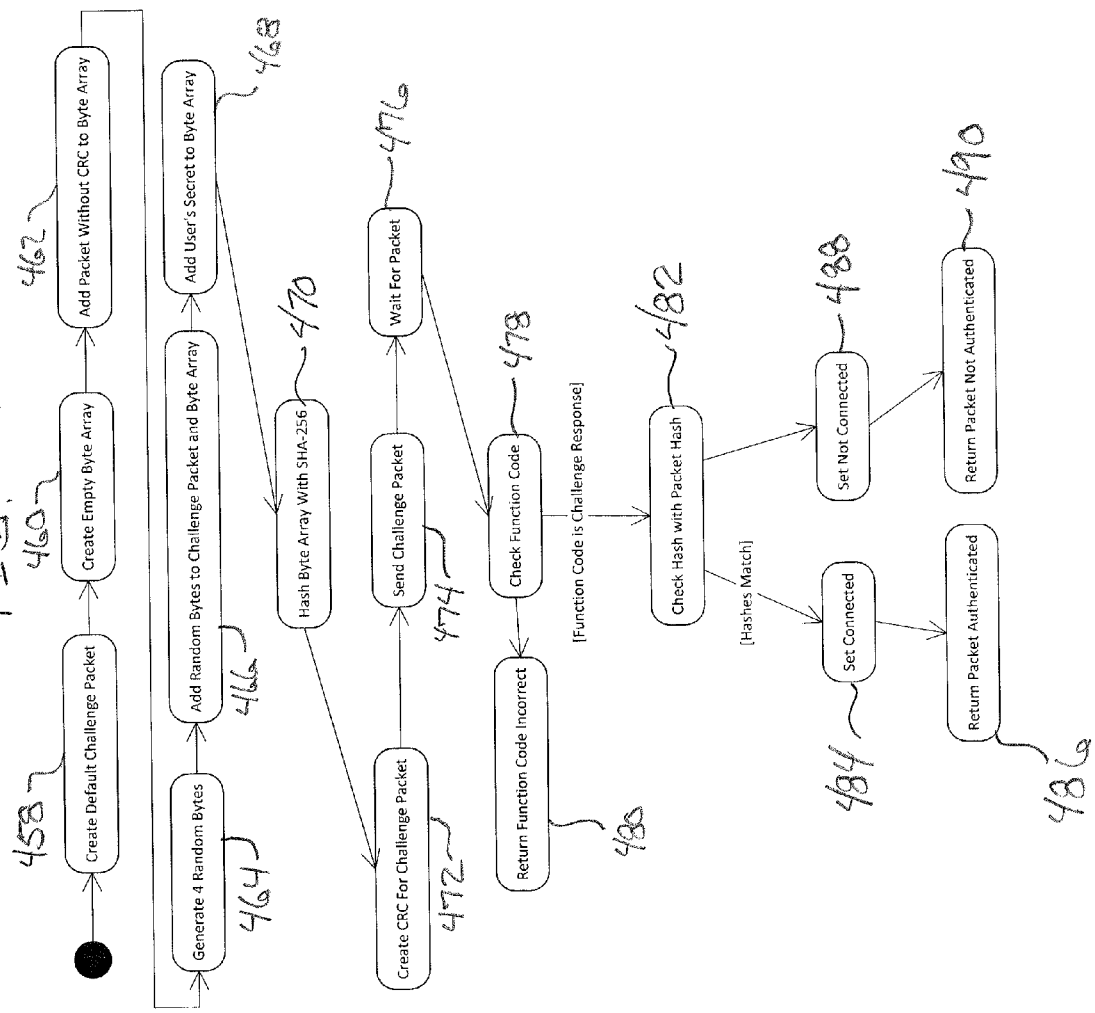
FIG. 21 is a flow diagram of an exemplary challenge response process from the perspective of the Field Device Security Pre-Processor device, according to the invention.

FIG. 21 is a flow diagram of the challenge response process from the perspective of the FD-SPP 408. The FD-SPP 408, performs the following steps: step 458, creating a default challenge packet; step 460, creating an empty byte array; step 462, adding the default challenge packet, without a CRC, to the byte array; step 464, generating 4 random bytes (i.e., a nonce); step 466 adding the random bytes to the challenge packet and the byte array; step 468, adding the user's secret to the byte array; step 470, hashing the byte array with SHA-256; step 472, creating a CRC for the challenge packet; step 474, sending the challenge packet; and step 476, waiting for a challenge response packet to be returned. The support component 410, upon receiving the challenge packet, will then prepare a challenge response packet with the challenge response function code by adding the user's secret to the challenge packet and the random bytes and hashing the result with SHA-256. The support component 410 then returns the challenge response packet, and the FD-SPP 408 then performs step 478, check the function code of the challenge response packet. If the function code is incorrect (i.e., if the function code does not indicate that the packet is a challenge response packet), then the process terminates at step 480. If the function code is correct (i.e., if the function code indicates this is challenge-response packet), then the FD-SPP 408 performs step 482, checking the previously generated hash of the byte array with the hash returned in the challenge response packet. If the hashes match, then step 484 is set the state of the FD-SPP 408 as "connected," allowing further communication with the Master 402/support component 410. Step 486 is then returning a "packet authenticated" message to the Master 402/support component 410. If the hashes do not match, then step 488 is setting the state of the FD-SPP 408 as "not connected," and step 490, returning a "packet not authenticated" message to the Master 402/support component 410. This figure describes in detail steps 552 and 554 of FIG. 27, discussed below. At step 554 in FIG. 27 if the response packet does not have a challenge response function code (i.e., the challenge response function code is incorrect) then the packet is sent to step 544 in FIG. 27 to be processed as a regular Modbus message, which could then be passed through or rejected. If the packet is not authenticated then it is rejected and flow returns to step 542 in FIG. 27, to wait for the next message (packet).

Once authenticated, the user will be considered "connected" and further requests sent with the user ID will be passed through unless the "connected" status expires due to the passage of time, or unless the requested operation is a critical operation that has been determined (i.e., pre-determined) to require re-authentication of the user via the challenge response process described above.

The determination of whether a user is authorized to request a requested operation, and the determination whether the requested operation is a critical operation that has been determined to required re-authentication, may utilize dual Bloom Filters, as described below.

Figure 22:
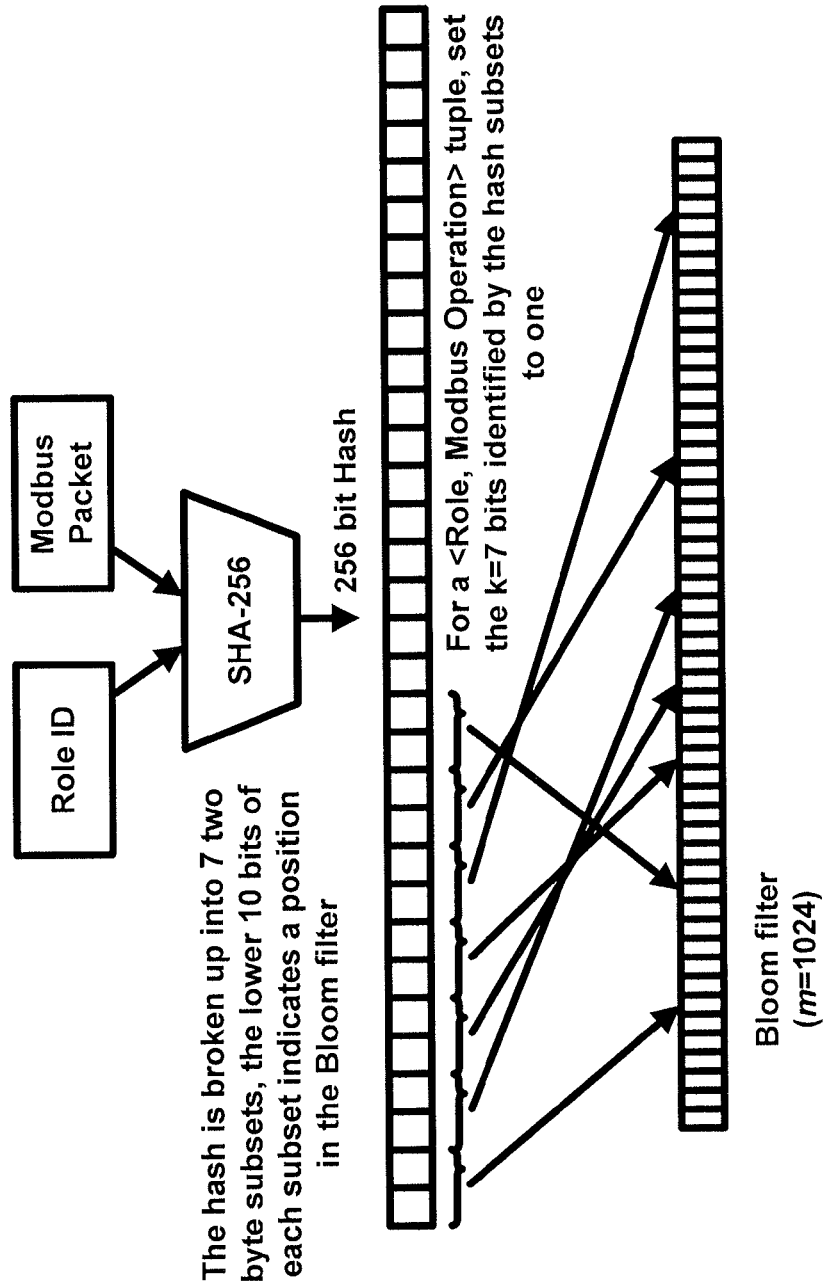
FIG. 22 is a schematic diagram of an exemplary process of generating a Bloom Filter for use in the role based access control (RBAC) function of the Field Device Security Pre-Processor device, according to the invention.

FIG. 22 is a schematic diagram of a process of generating a Bloom Filter for use in the role based access control (RBAC) function 422 of the security cell address space 414 of the FD-SPP 408, as discussed below.

A Bloom Filter is a probabilistic data structure for determining whether or not an object is a member of a set. The advantage of Bloom filters is that they maintain their size no matter how many elements are added to the data structure and are, therefore, relatively quick to use for a security filtering function (as opposed to full link-level encryption, as mentioned above). The disadvantage of a bloom filter is that it has a false positive rate. The probability of a false negative is zero.

Generally, in order to create a Bloom Filter, create an empty array of "m" bits. This represents an empty bloom filter and will return false when any element is checked for membership in the Bloom Filter. To add an element to the bloom filter the element is first passed through "k" hash functions. The result of each of these hash functions will be used to create a position in the bloom filter array. The bit at each of these positions will then be set to 1. In order to check if an element is in the bloom filter these same hash functions are used to create "k" positions in the Bloom Filter. If all the positions have a "1" in the bit array the object is said to be in the Bloom Filter.

The FD-SPP 408 utilizes a Bloom Filter for the role based access control function 422, as follows. First create an empty bloom filter. Then add packets one by one along with their associated role to the Bloom Filter. In order to add the packet to the Bloom Filter the packet and the role ID (user ID) are combined then hashed using the SHA-256 hash algorithm. The resulting hash is broken up to create the required number of hash functions for the bloom filter (in the example shown in FIG. 22, the required number of hash functions is 7).

For this security application a second Bloom Filter is created as well. The second Bloom Filter has the same number of bits and uses the exact same hashes to populate its filter. Entries are only added to second Bloom Filter when they are to be challenged.

Thus, the two Bloom Filters provide determination of: 1) whether the user is allowed to perform the requested function; and 2) whether the requested function requires a challenge (i.e., whether the requested function is important enough to require re-authentication of the user).

When an entry is checked in the Bloom Filters, it is hashed using the same strategy that is used when adding a new element. The positions are checked in the RBAC Bloom filter first. If all the bits are not one the packet is rejected by the RBAC. If the packet is not rejected the same positions are checked in the second bloom filter. If all the bits are 1 in this filter then the packet is checked with challenge response, otherwise the packet is allowed through without being challenged.

Figure 23:
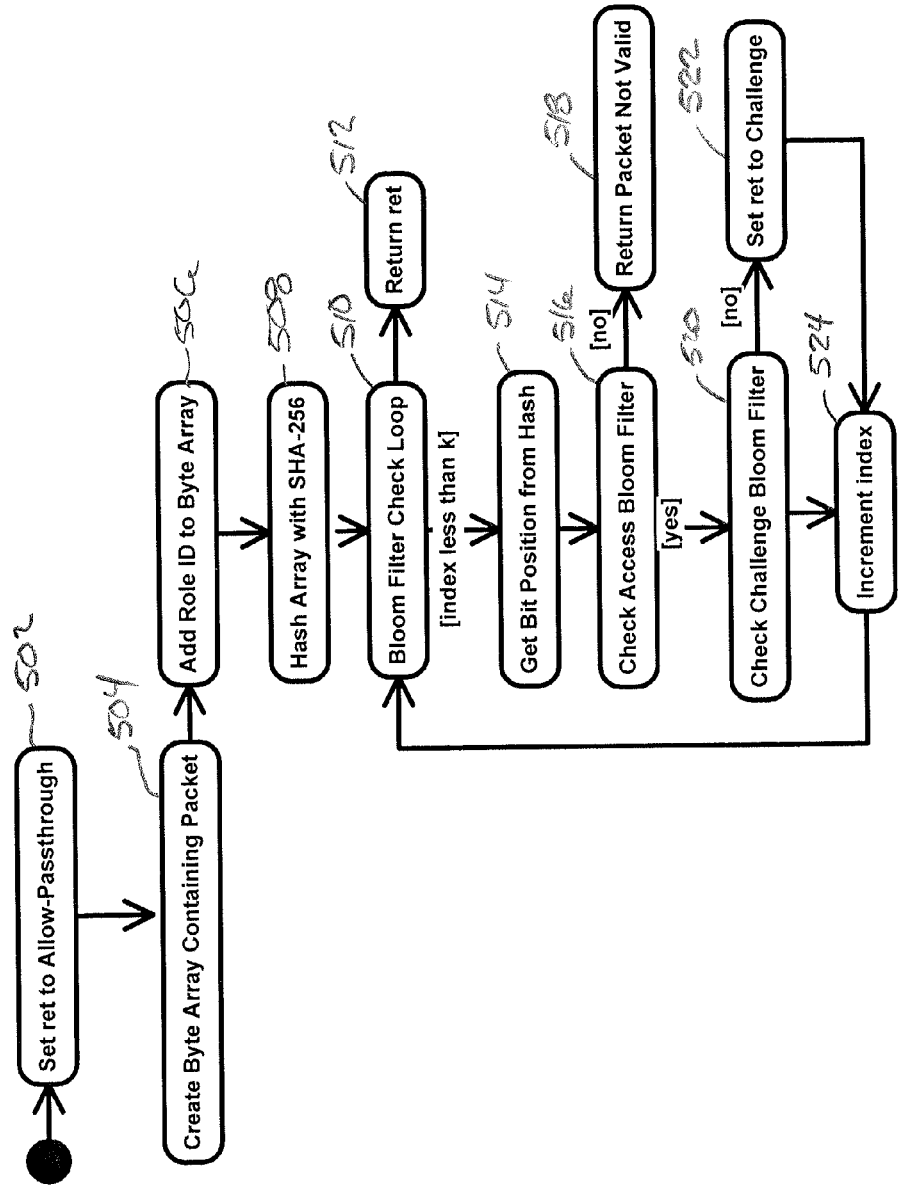
FIG. 23 is a flow diagram of an exemplary process of checking entries in a Bloom Filter, according to the invention.

FIG. 23 shows the process 500 of checking the entries in the Bloom Filters. This figure shows the control logic and flow diagram for using the dual Bloom Filter structure to make the role based access control (i.e. authorization) decision for a given SCADA message (e.g., a requested operation, or a Modbus message in the exemplary embodiment). Input into this routine is a single SCADA message and the user role ID (i.e., user ID) associated with the SCADA message (known to the system and authenticated during the most recent challenge response exchange, possibly triggered by a connection request). The required decision to be made is whether to: a) allow the packet to pass through (if it is an authorized operation not needing to be challenged); b) challenge the packet (operation is allowed for this user, but a valid challenge response exchange (for this operation) is required first; or c) reject the packet if this is not an authorized operation for this user role ID. Step 502 initially sets the return value to Allow-Passthrough. Then, in step 504, a byte array is created from the packet, and in step 506, the user role ID, as a byte array, is appended to the packet byte array. In step 508, a SHA-256 hash is then made of the packet byte array. For each of the two Bloom filters, there are k bit positions. These bit position are used when populating the bloom filter during initialization described above. In steps 510-520, each bit position is considered in order, with the index initially 0, and in step 524 incremented as each bit position is checked in both step 516, check Access Bloom Filter, and step 520, check Challenge Bloom Filter. If any bit position is found to be 0 in step 516, check Access Bloom filter, then the routine returns the decision "Packet not valid" (step 518). If any bit position in the Challenge Bloom filter is found to be 0, then the routine returns the decision "Challenge" indicating that the message is allowed for this role but a challenge and valid response are needed first (step 522). If the bit in each bit position is '1' in both filters for all bit positions, the default decision "allow pass through" is made (step 512).

Example Bloom Fliter

The following packets were added to the dual bloom filters. The first number is the role id, and the string is the packet data in hex. The last value is a Boolean representing whether the packet should be challenged and therefore added to both filters.

1, "01020000000C780F",false
2, "01020000000C780F",false
1, "010F0000000401003E96",true
1, "010F000000040101FF56",true
1, "010F000000040102BF57",true
1, "010F0000000401037E97",true
1, "010F0000000401043F55",true
1, "010F000000040105FE95",true
1, "010F000000040106BE94",true
1, "010F0000000401077F54",true
1, "010F0000000401083F50",true
1, "010F000000040109FE90",true
1, "010F00000004010ABE91",true
1, "010F00000004010B7F51",true
1, "010F00000004010C3E93",true
1, "010F00000004010DFF53",true
1, "010F00000004010EBF52",true
1, "010F00000004010F7E92",true After creating the Bloom Filter, it is possible to more accurately determine its false positive rate. Using "m" as the number of bits, "k" as the number of hash functions, "n" as the number of elements, and "p" as the false positive rate, a false positive rate for any n elements can be determined to be:

$$p(n) = \left(1 - e^{-\frac{7}{1024}n}\right)^7 \quad (1)$$

The example includes 18 entries, therefore n=18. Using the equations above for p(n):

$$p(18) = \left(1 - e^{-\frac{7}{1024} \cdot 18}\right)^7 = 2.7889 \; 10^{-7} \quad (2)$$

However this is merely the theoretical false positive rate of the approximation of the Bloom Filter after 18 entries. Using an actual Bloom Filter, the number of ones in the bloom filter can be used to calculate the actual false positive rate of this specific bloom filter. This is done by counting the number of bits in the Bloom Filter that have been set to 1. This Bloom Filter is shown in the following byte array of hex values.
{0xc0, 0x41, 0x00, 0x04, 0x20, 0x00, 0x20, 0x28, 0x28, 0x04, 0x80, 0x14, 0x00, 0x01, 0x00, 0x00, 0x00, 0x00, 0x92, 0x08, 0x0a, 0x80, 0x00, 0x20, 0x04, 0x08, 0x02, 0x44, 0x22, 0x08, 0x08, 0x04, 0x00, 0x08, 0x05, 0x04, 0x00, 0x80, 0x08, 0x04, 0x04, 0x04, 0x00, 0x20, 0x00, 0x01, 0x81, 0x40, 0x02, 0x00, 0x04, 0x10, 0x20, 0x00, 0x20, 0x00, 0x10, 0x00, 0x40, 0x08, 0x12, 0x00, 0x29, 0x18, 0x00, 0x08, 0x0b, 0x01, 0x00, 0x00, 0x01, 0x20, 0x00, 0x20, 0x00, 0x11, 0x00, 0x20, 0x88, 0x00, 0x00, 0x04, 0x00, 0x00, 0x24, 0x60, 0x08, 0x06, 0x40, 0x00, 0x09, 0x08, 0x0a, 0x04, 0x20, 0x0c, 0x02, 0x00, 0x00, 0x00, 0x00, 0x00, 0x52, 0x00, 0x08, 0x01, 0x4a, 0x00, 0x01, 0x00, 0x08, 0x48, 0x00, 0x10, 0x00, 0x00, 0x80, 0x00, 0x42, 0x06, 0x00, 0x04, 0x41, 0x04, 0x01, 0x00, 0x04, 0x00}

This Bloom filter of 1024 bits has 119 bits set to the value of 1. Therefore the probability of any single bit being a 1 is simply 119/1024.

$$p = \left(\frac{119}{1024}\right)^7 = 2.8624 \; 10^{-7} \quad (3)$$

Alternatively the second bloom filter can be configured to not challenge entries that are in the bloom filter instead of challenging the entries that are in the bloom filter.

It can be shown that if the second Bloom Filter is configured to hold non-challenged messages, this will always result in a lower false positive rate. Furthermore, there are well known techniques for further reducing false positive rate increasing the collision rate for inserted items (total number of 1 bits is reduced-> reduces the false positive rate).

Example Implementation

In order to use this technique all packets on the Modbus system must be known, and which users are allowed to send them must be known. In order to create this packet list semi-autonomously instead of by requiring the user to create each packet manually, the security for the system can be turned off and instead the FD-SPP 408 will act as a Modbus serial packet analyzer. The filtering cell will output each of the packets it receives to a communications port which can be monitored by another piece of software to create the Bloom Filter.

Figure 24:
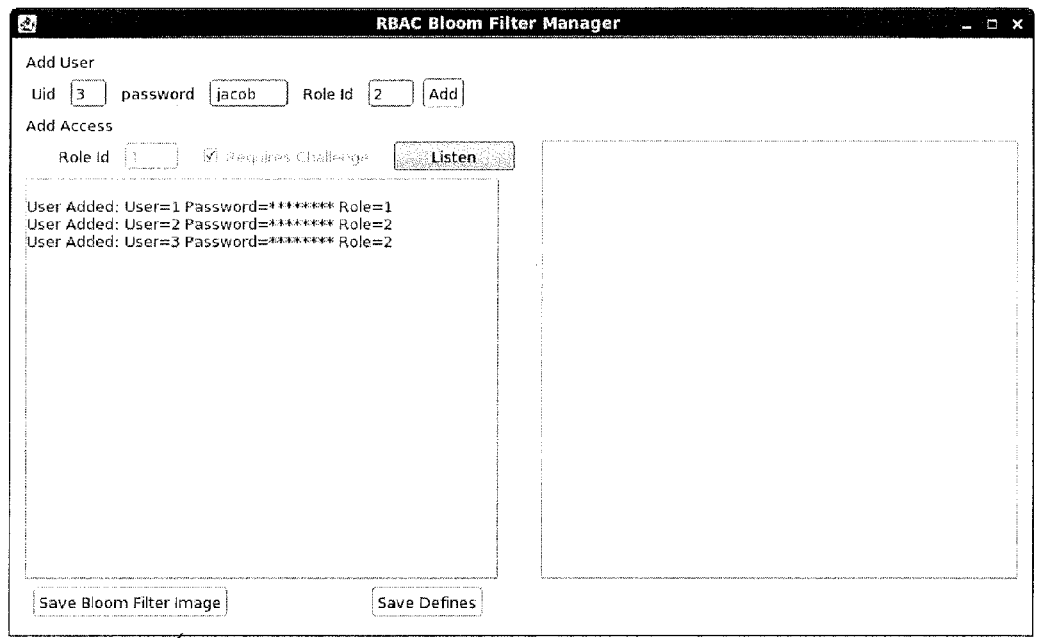
FIG. 24 is a representation of an exemplary user interface screen of an example software program for creating a Bloom Filter.

FIG. 24 shows a user interface screen 530 of an exemplary piece of software that creates Bloom Filters. This software allows the user to create all the users and roles for a Secured Modbus System. Once the roles are created the system can enter a "listen" mode. Once this mode is entered all the packets received are added to the Bloom Filter for the current user that is selected. Additionally whether these packets are challenged or not can be selected. So the process for adding packets to a role is simple, place the software into "listen" mode then continue operations normally for that particular role. Then change the role and do the same for another role. After all the roles have had their packets added, the Bloom Filter can be saved and implemented into the FD-SPP 408.

Example FD-SPP

As discussed above, the FD-SPP 408 uses a microkernel based architecture as part of its security. In the exemplary embodiment described herein, an OKL4 microkernel is used to achieve the architecture. OKL4 is a member of the L4 family of operating systems. The L4 operating systems are second generation microkernel operating systems. OKL4 only provides the most basic essentials required for an operating system and leaves the remainder of the design up to the developers. Another L4 operating system seL4 has been formally verified. This means that there is a machine checked mathematical proof that the implementation in code of seL4 matches the code specifications. It also means that seL4 code is proven to be free from common programming errors such as buffer overflows and null pointer accesses. Although this doesn't imply security, it is a starting point for building secure software. Additionally this allows the software above the kernel to be verified since the kernel is verified. OKL4 is closely related to this seL4 verified distribution.

OKL4 allows the division of software above the kernel layer into cells. These cells each have their own virtual memory and are segregated from the other cells. A buffer overflow in cell A cannot affect cell B. Communication between the cells is provided via inter-process communication (IPC) in the kernel layer. Additionally, like all microkernels, device driver level code is in the user application layer. This means that cells can have access to the hardware. However to prevent this from being a security issue only one cell can have write access to any given register. Cells can however share read access to a register. All memory operations including access to hardware registers are performed using a virtual memory system provided by the OKL4 microkernel.

Figure 25:
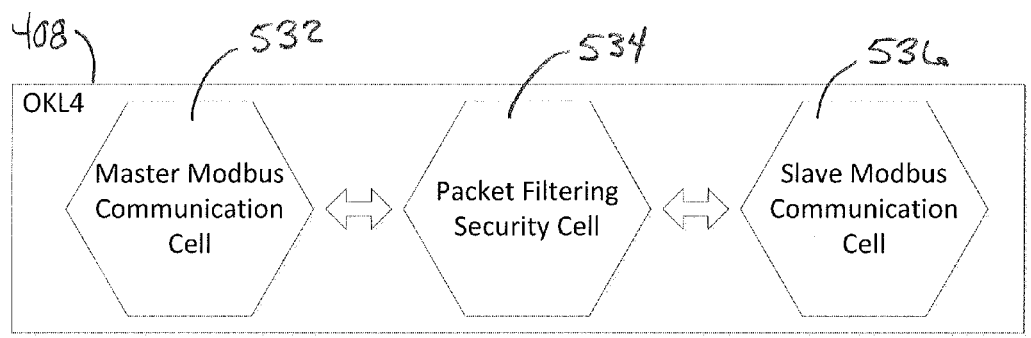
FIG. 25 is a schematic representation of the architecture of an exemplary Field Device Security Pre-Processor device using the extended Modbus protocol.

As shown in FIG. 25, the exemplary FD-SPP 408 comprises three cells: a Master Modbus Communication Cell 532 (i.e. communications network interface address space), a Packet Filtering Security Cell 534 (i.e., security cell address space), and a Slave Modbus Communication Cell 536 (i.e., field device interface address space).

The Master Modbus Communication Cell 532 is responsible for receiving and sending data to the support component 410, which in example is the virtual serial device 410a, and the Master 402. This cell has a driver for one of the UARTs on the device, which allows it to communicate over RS-232 with the virtual serial device 410a and the Master 402. The Master Modbus Communication Cell 532 then scans the data received by the UART until it finds a valid Modbus packet. This packet is then sent to the Packet Filtering Security Cell 534 via IPC. Since the Master Modbus Communication Cell 532 only sends valid packets to the Packet Filtering Security Cell 534, the Packet Filtering Security Cell 534 is protected from attacks using invalid packets. The Packet Filtering Security Cell 536 also sends packets to the Master Modbus Communication Cell 534 which is responsible for forwarding these packets to the Master 402/virtual serial device 410a.

The Slave Modbus Communication Cell 536 has very similar operations will the Master Modbus Communication Cell 532. Additionally, the code for the two cells is almost identical. The Slave Modbus Communication Cell 536 sends and receives data via RS-232 with the field device 404. When it receives data, it automatically forwards such data to the Packet Filtering Security Cell 534, which then passes it through to the Master Modbus Communication Cell 532. There is no filtering of data for packets being transferred from the Slave Modbus Communication Cell 536 to the Master Modbus Communication Cell 532. Additionally, the Slave Modbus Communication Cell 536 will receive packets from the Packet Filtering Security Cell 534 which it then forwards to the field device 404.

The Packet Filtering Security Cell 534 has several functions. Its most simple function is forwarding packets from the Slave Modbus Communication Cell 536 to the Master Modbus Communication Cell 532. When the Packet Filtering Security Cell 534 receives an IPC call from the Slave Modbus Communication Cell 536, it simply forwards this IPC call to the Master Modbus Communication Cell 532. The primary task of the Packet Filtering Security Cell 534 is extracting the added security pieces out of the extended Modbus packets, and only sending packets that are verified to the Slave Modbus Communication Cell 536. This involves several tasks: Creating and Managing User Connections, Creating and Validating Challenge Response packets, and performing role based access control for each packet and each user. More details on how the Packet Filtering Security cell performs these operations are described below.

Figure 26:
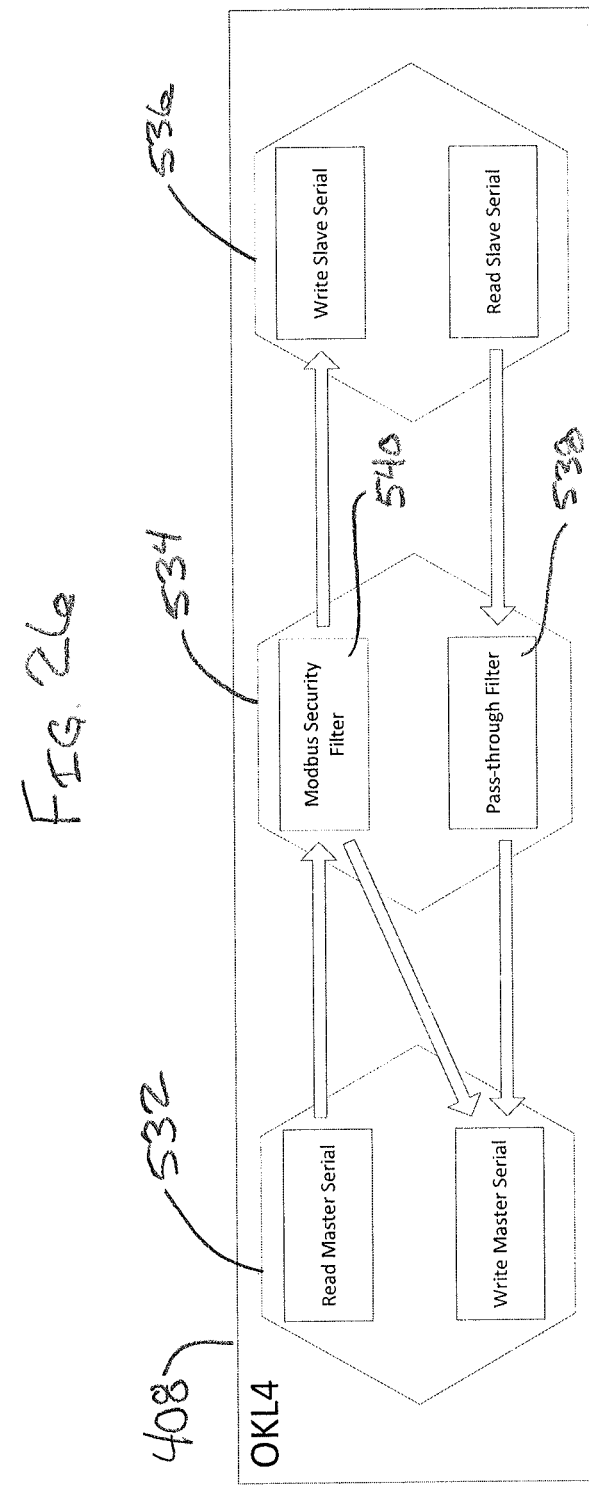
FIG. 26 is a schematic representation of the architecture of the exemplary Field Device Security Pre-Processor of FIG. 25, showing IPC calls.

FIG. 26 shows the three cells of the FD-SPP 408 augmented to show IPC calls of the system. The Master Modbus Communication Cell 532 and the Slave Modbus Communication Cell 536 do not have any direct communication. This means that in order for a packet to be sent to the field device 404, it must be passed through two layers of IPC and two layers of validation checks. Due to the nature of OKL4, a vulnerability in one of these layers cannot be exploited to the next layer. This makes it very difficult for an attack packet to propagate through the FD-SPP 408.

Like the communication cells 532, 536, which have two threads each, the Packet Filtering Security Cell 534 also has two threads: a pass-through filter thread 538 for managing traffic from the Slave Modbus Communication Cell 536 to the Master Modbus Communication Cell 532, and a Modbus security filter thread 540 for managing traffic from the Master Modbus Communication Cell 532 to the Slave Modbus Communication Cell 536.

The pass-through filter thread 538 is very simple. It waits for packets from the Slave Modbus Communication Cell 536, then forwards them to the Master Modbus Communication Cell 532.

The Modbus security filter thread 540 is much more complex. This cell is responsible for setting up communications with a user, performing Role Based Access Control, and validating packets via challenge response.

Figure 27:
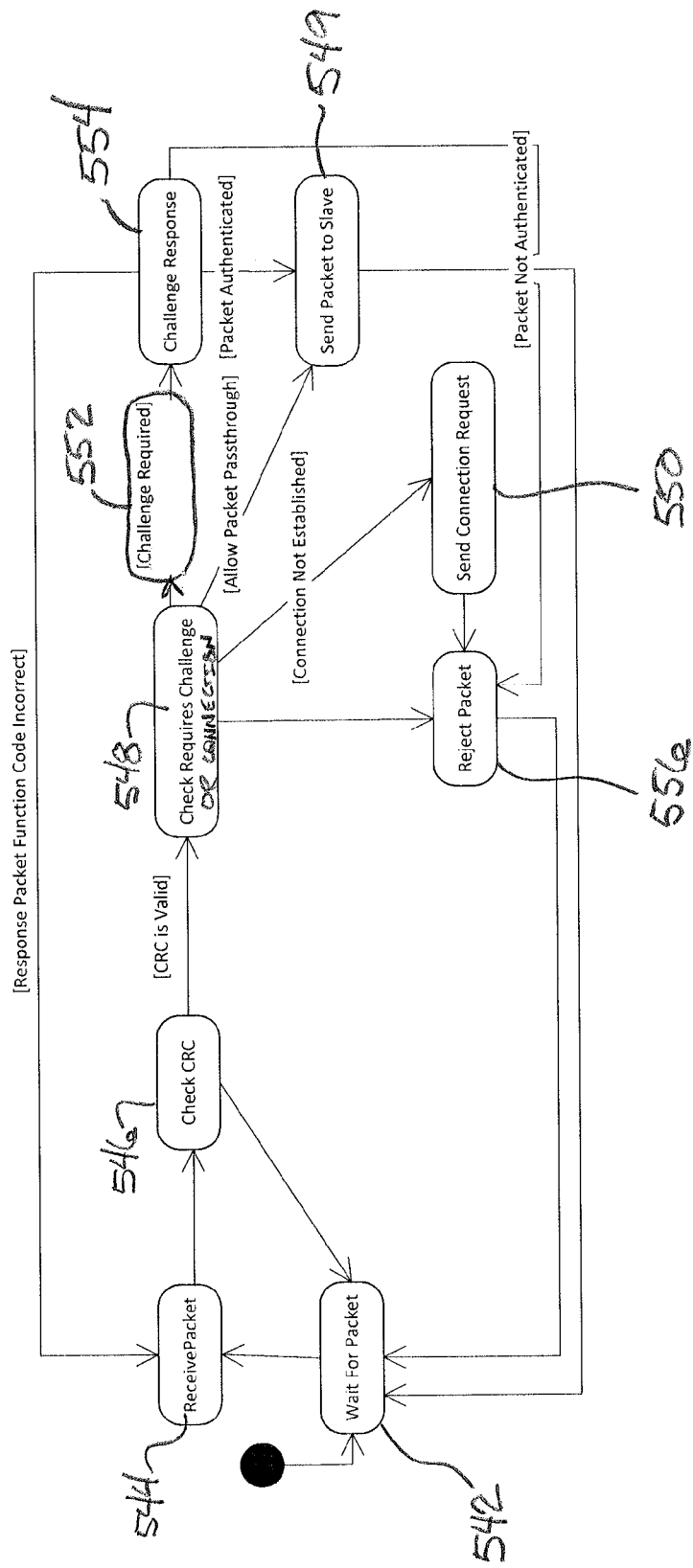
FIG. 27 is a flow diagram of operation of an exemplary Modbus security filter thread.

FIG. 27 is a flow diagram of operation of the Modbus security filter thread 540. Initially, in step 542, the Modbus security filter thread 540 waits for a packet from the Master Modbus Communication Cell 532. After receiving a packet (step 544), the Modbus security filter thread 540 checks the CRC (step 546). Next, in step 548, the Modbus security filter thread 540 checks the packet to determine if the requested function requires a challenge or a connection request before allowing the packet to pass through. If a challenge or a connection request is not required, then step 549 is sending the packet through to the Slave Modbus Communication Cell 536, which forwards the packet to the field device 404. If a connection has not been previously established with the user requesting the function, in step 550 the Modbus security filter thread 540 sends a connection request back to the Master Modbus Communication Cell 532, which forwards the connection request to the Master 402/virtual serial device 410a. Likewise, if the Modbus security filter thread 540 determines that the requested function requires a challenge, the Modbus security filter thread 540, in step 552, sends a challenge to the Master Modbus Communication Cell 532, which forwards the challenge to the Master 402/virtual serial device 410a. In step 554, following receipt of a challenge response packet, the challenge response packet is evaluated. If the challenge response packet is authenticated, in step 549 the authenticated packet is sent to the Slave Modbus Communication Cell 536, which forwards the packet to the field device 404. Otherwise, in step 556 the packet is rejected.

FIG. 28 shows more detail for step 548, check the packet to determine if the requested function requires a challenge or a connection request. In step 558, the Modbus security filter thread 540 saves the address of the field device 404. Then, in step 560, the Modbus security filter thread 540 determines if the packet is a connection request. If the packet is a connection request, the Modbus security filter thread 540 then determines if the user ID is valid in step 562. If the user ID is valid, then the Modbus security filter thread 540, in step 552, sends a challenge to the Master Modbus Communication Cell 532, which forwards the challenge to the Master 402/virtual serial device 410a. If the user ID is invalid, the Modbus security filter thread 540, in step 564, rejects the packet and sends a connection required message to the Master Modbus Communication Cell 532, which forwards the challenge to the Master 402/virtual serial device 410a.

If the packet is not a connection request, then in step 566 the connection status is checked. If the connection status is not "connected," then the Modbus security filter thread 540 executes step 564, reject the packet and sends a connection required message to the Master Modbus Communication Cell 532, which forwards the challenge to the Master 402/virtual serial device 410a. If the connection status is "connected," then the Modbus security filter thread 540 executes step 568, check if administrator. The FD-SPP 408 includes, by default, one special role, namely an administrator role. All messages with this associated role are challenged but the messages are not checked against the Access Control filter. This role can be disabled by not assigning it to any user, but provides a means to send commands to the field device that are not in the Bloom Filter. If the role of the User ID is an administrator role, then the Modbus security filter thread 540 executes step 552, sends a challenge to the Master Modbus Communication Cell 532, which forwards the challenge to the Master 402/virtual serial device 410a. If the role of the User ID is not an administrator role, then the Modbus security filter thread 540 executes step 570, check Bloom Filter entries, to determine whether the requesting user is allowed to perform the requested function, and whether the requested function requires a challenge. In step 572, the Bloom Filter result is returned.

Creation of Digitally Signed Messages

A Digital Signature is created the same way the challenge response hashes are. They are created by hashing the Modbus packet without the CRC, with 4 bytes of nonce, with an 8 byte pre-shared secret using the SHA-256 hash algorithm. The Digital Signature is then appended to the Modbus Packet without a CRC. A Modbus CRC for this new combined packet is then appended to the end to create a valid Modbus Packet. Using a Digital Signature instead of a challenge response reduces the overhead created by the extra message passing that is required for a challenge response. This way the only time that is added to the process is the time it takes to sign the packet.

Additional Steps and Configurations

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A device for processing communications for secure operation of industrial control system field devices, comprising:
   a processor, a memory, and a communication controller operably connected to form a processing device to be placed in-line between a Master Telemetry Unit (MTU) and a field device;
   a software verified microkernel stored in the memory including instructions for the processing device to provide a secure partitioning of the memory between a communication network interface address space, a security cell address space, and a field device interface address space;
   the communication network interface address space including software instructions and memory space for the processor to manage communication messages with the MTU, each communication message including a user identification identifying the sender of the message and a requested operation to be performed by the field device;
   the field network interface address space including software instructions and memory space for the processor to manage communication messages with the field device; and
   the security cell address space including software instructions and memory space for the processor to:
      receive communication messages from the MTU via the communication network interface address space;
      authenticate the user identification of each communication message;
      verify that the operation requested in each message is authorized for the user identification; and
      send each communication message having an authenticated user identification and a verified operation to the field network interface address space for communication with the field device.

2. The device of claim 1, wherein the software instructions for the processor to authenticate the user identification of each communication message include instructions for the processor to:
   send a first challenge packet to the MTU via the communication network interface address space in response to determining that the operation requested in a message is a connection request, the first challenge packet including a first nonce;
   hash an authentication byte array including the first nonce and a pre-shared secret value for the user identification to create an authentication byte array hash; and
   in response to receiving a challenge response packet from the MTU via the communication network interface address space, authenticate the user identification when a packet hash of the challenge response packet matches the authentication byte array hash.

3. The device of claim 2, wherein the software instructions for the processor to verify that the operation requested in each message is authorized for the user identification include instructions for the processor to:

in response to receiving a communication message with an authenticated user identification, hash a verification byte array including the requested operation and the user identification to create a verification byte array hash; and verify that the operation requested in each message is authorized for the user identification when:

each bit position of the verification byte array hash has a "1" in the corresponding bit position of an access Bloom Filter, the access Bloom Filter prepopulated with authorized operations permitted for the user identification; and each bit position of the verification byte array hash has a "1" in the corresponding bit position of a challenge Bloom Filter, the challenge Bloom Filter prepopulated with authorized operations not requiring a challenge.

4. The device of claim 3, wherein the software instructions for the processor to verify that the operation requested in each message is authorized for the user identification include instructions for the processor to:

when each bit position of the verification byte array hash does not have a "1" in the corresponding bit position of a challenge Bloom Filter, send a second challenge packet to the MTU via the communication network interface address space, the second challenge packet including a second nonce;

hash a re-authentication byte array including the second nonce and the pre-shared secret value for the user identification to create a re-authentication byte array hash;

in response to receiving a challenge response packet from the MTU via the communication network interface address space, re-authenticate the user identification when a packet hash of the challenge response packet matches the re-authentication byte array hash; and verify that the operation requested in the message is authorized for the user identification when the user identification is re-authenticated.

5. The device of claim 2, wherein the software instructions for the processor to verify that the operation requested in each message is authorized for the user identification include instructions for causing the processor to:

in response to receiving a communication message with an authenticated user identification, and when the authenticated user identification is an administrator user identification, send a second challenge packet to the MTU via the communication network interface address space, the second challenge packet including a second nonce;

hash a re-authentication byte array including the second nonce and the pre-shared secret value for the user identification to create a re-authentication byte array hash; and verify that the operation requested in the communication message is authorized for the user identification in response to receiving a challenge response packet from the MTU via the communication network interface address space when a packet hash of the challenge response packet matches the re-authentication byte array hash.

6. A method for processing communications for secure operation of industrial control system field devices, comprising:

partitioning, by a processor executing a software verified microkernel, a memory between a communication network interface address space, a security cell address space, and a field device interface address space;

managing, by the processor executing software instructions of the communication network interface address space, communication messages with a Master Telemetry Unit (MTU), each communication message including a user identification identifying the sender of the message and a requested operation to be performed by a field device;

managing, by the processor executing software instructions of the field network interface address space, communication messages with the field device;

receiving, by the processor executing software instructions of the security cell address space, communication messages from the MTU via the communication network interface address space;

authenticating, by the processor executing software instructions of the security cell address space, the user identification of each communication message;

verifying, by the processor executing software instructions of the security cell address space, that the operation requested in each message is authorized for the user identification; and sending, by the processor executing software instructions of the security cell address space, each communication message having an authenticated user identification and a verified operation to the field network interface address space for communication with the field device.

7. The method of claim 6, wherein authenticating the user identification of each communication message further comprises:

sending a first challenge packet to the MTU via the communication network interface address space in response to determining that the operation requested in a message is a connection request, the challenge packet including a first nonce;

hashing, by the processor executing software instructions of the security cell address space, an authentication byte array including the first nonce and a pre-shared secret value for the user identification to create an authentication byte array hash; and in response to receiving a challenge response packet from the MTU via the communication network interface address space, authenticating, by the processor executing software instructions of the security cell address space, the user identification when a packet hash of the challenge response packet matches the authentication byte array hash.

8. The method of claim 7, wherein verifying that the operation requested in each message is authorized for the user identification further comprises:

in response to receiving a communication message with an authenticated user identification, hashing a verification byte array including the requested operation and the user identification to create a verification byte array hash; and verifying that the operation requested in each message is authorized for the user identification when:

each bit position of the verification byte array hash has a "1" in the corresponding bit position of an access Bloom Filter, the access Bloom Filter prepopulated with authorized operations permitted for the user identification; and each bit position of the verification byte array hash has a "1" in the corresponding bit position of a challenge Bloom Filter, the challenge Bloom Filter prepopulated with authorized operations not requiring a challenge.

9. The method of claim 8, wherein verifying that the operation requested in each message is authorized for the user identification further comprises:
   when each bit position of the verification byte array hash does not have a "1" in the corresponding bit position of a challenge Bloom Filter, sending a second challenge packet to the MTU via the communication network interface address space, the second challenge packet including a second nonce;
   hashing a re-authentication byte array including the second nonce and the pre-shared secret value for the user identification to create a re-authentication byte array hash;
   in response to receiving a challenge response packet from the MTU via the communication network interface address space, re-authenticating the user identification when a packet hash of the challenge response packet matches the re-authentication byte array hash; and
   verifying that the operation requested in the message is authorized for the user identification when the user identification is re-authenticated.

10. The method of claim 7, wherein verifying that the operation requested in each message is authorized for the user identification further comprises:
    in response to receiving a communication message with an authenticated user identification, and when the authenticated user identification is an administrator user identification, sending a second challenge packet to the MTU via the communication network interface address space, the second challenge packet including a second nonce;
    hashing a re-authentication byte array including the second nonce and the pre-shared secret value for the user identification to create a re-authentication byte array hash; and
    verifying that the operation requested in the communication message is authorized for the user identification in response to receiving a challenge response packet from the MTU via the communication network interface address space when a packet hash of the challenge response packet matches the re-authentication byte array hash.

11. A system for processing communications for secure operation of an industrial control system field device comprising:
    a field device;
    a Master Telemetry Unit (MTU) communicating with the field device via communication messages;
    a security pre-processor device in communication with the MTU and the field device, and collocated with the field device, the security pre-processor device including:
      a processor, a memory, and a communication controller operably connected to form a processing device to be placed in-line between the MTU and the field device;
      a software verified microkernel stored in the memory and includes instructions for the processing device to provide a secure partitioning of the memory between a communication network interface address space, a security cell address space, and a field device interface address space;
      the communication network interface address space including software instructions and memory space for the processor to manage communication messages with the MTU, each communication message including a user identification identifying the sender of the message and a requested operation to be performed by the field device;
      the field network interface address space including software instructions and memory space for the processor to manage communication messages with the field device; and
      the security cell address space including software instructions and memory space for the processor to:
        receive communication messages from the MTU via the communication network interface address space;
        authenticate the user identification of each communication message;
        verify that the operation requested in each message is authorized for the user identification; and
        send each communication message having an authenticated user identification and a verified operation to the field network interface address space for communication with the field device.

12. The system of claim 11,
    wherein the software instructions for the processor to authenticate the user identification of each communication message include instructions for the processor to:
      send a first challenge packet to the MTU via the communication network interface address space in response to determining that the operation requested in a message is a connection request, the first challenge packet including a first nonce;
    wherein the MTU includes a support component for:
      receiving the first challenge packet;
      displaying a prompt to enter a secret value;
      in response to receiving the secret value, hashing the first nonce with the secret value to create a packet hash;
      creating a challenge response packet including the packet hash; and
      sending the challenge response packet to the security pre-processor device;
    wherein the software instructions for the processor to authenticate the user identification of each communication message include instructions for the processor further to:
      hash an authentication byte array including the first nonce and a pre-shared secret value for the user identification to create an authentication byte array hash; and
      in response to receiving the challenge response packet from the MTU via the communication network interface address space, authenticate the user identification when the packet hash of the challenge response packet matches the authentication byte array hash.

13. The system of claim 12, wherein the software instructions for the processor to verify that the operation requested in each message is authorized for the user identification include instructions for the processor to:
    in response to receiving a communication message with an authenticated user identification, hash a verification byte array including the requested operation and the user identification to create a verification byte array hash; and
    verify that the operation requested in each message is authorized for the user identification when:
      each bit position of the verification byte array hash has a "1" in the corresponding bit position of an access Bloom Filter, the access Bloom Filter prepopulated with authorized operations permitted for the user identification; and each bit position of the verification byte array hash has a "1" in the corresponding bit position of a challenge Bloom Filter, the challenge Bloom Filter prepopulated with authorized operations not requiring a challenge.

14. The system of claim 13, wherein the software instructions for the processor to verify that the operation requested in each message is authorized for the user identification include instructions for the processor to:

- when each bit position of the verification byte array hash does not have a "1" in the corresponding bit position of a challenge Bloom Filter, send a second challenge packet to the MTU via the communication network interface address space, the second challenge packet including a second nonce;
- hash a re-authentication byte array including the second nonce and the pre-shared secret value for the user identification to create a re-authentication byte array hash;
- in response to receiving a challenge response packet from the MTU via the communication network interface address space, re-authenticate the user identification when a packet hash of the challenge response packet matches the re-authentication byte array hash; and
- verify that the operation requested in the message is authorized for the user identification when the user identification is re-authenticated.

15. The system of claim 12, wherein the software instructions for the processor to verify that the operation requested in each message is authorized for the user identification include instructions for causing the processor to:

- in response to receiving a communication message with an authenticated user identification, and when the authenticated user identification is an administrator user identification, send a second challenge packet to the MTU via the communication network interface address space, the second challenge packet including a second nonce;
- hash a re-authentication byte array including the second nonce and the pre-shared secret value for the user identification to create a re-authentication byte array hash; and
- verify that the operation requested in the communication message is authorized for the user identification in response to receiving a challenge response packet from the MTU via the communication network interface address space when a packet hash of the challenge response packet matches the re-authentication byte array hash.

\* \* \* \* \*